United States Patent [19]
Takeuchi

[11] Patent Number: 5,798,894
[45] Date of Patent: Aug. 25, 1998

[54] ROTARY HEAD TYPE MAGNETIC RECORDING REPRODUCING APPARATUS

[75] Inventor: Hiroaki Takeuchi, Tenri, Japan

[73] Assignee: Sharp Kabushiki Kaisha, Osaka, Japan

[21] Appl. No.: 798,215

[22] Filed: Feb. 10, 1997

Related U.S. Application Data

[62] Division of Ser. No. 464,078, Jun. 5, 1995, Pat. No. 5,694,273.

[30] Foreign Application Priority Data

Nov. 16, 1994 [JP] Japan .................. 6-282202

[51] Int. Cl.$^6$ .................. G11B 5/56; G11B 21/24
[52] U.S. Cl. .................. 360/109; 360/107; 360/130.24
[58] Field of Search .................. 360/107, 109, 360/130.22, 130.23, 130.24, 77.16, 77.17, 10.2, 10.3

[56] References Cited

U.S. PATENT DOCUMENTS

| | | | |
|---|---|---|---|
| 4,363,046 | 12/1982 | Saito | 360/107 |
| 4,365,279 | 12/1982 | Kinjo | 360/77.16 |
| 4,446,497 | 5/1984 | Hirayama | 360/77.16 |
| 4,507,696 | 3/1985 | Hutter | 360/109 |
| 4,695,907 | 9/1987 | Inaji et al. | 360/130.24 |
| 4,709,287 | 11/1987 | Yamashita | 360/109 |
| 4,882,635 | 11/1989 | Sanai | 360/109 |
| 4,930,030 | 5/1990 | Yabu et al. | 360/107 |
| 4,970,611 | 11/1990 | Kodama et al. | 360/107 |
| 4,985,794 | 1/1991 | Kato et al. | 360/107 |
| 5,343,348 | 8/1994 | Nishima et al. | 360/107 |
| 5,432,658 | 7/1995 | Kajita et al. | 360/107 |
| 5,537,276 | 7/1996 | Mukae et al. | 360/109 |

FOREIGN PATENT DOCUMENTS

| | | | |
|---|---|---|---|
| 0145331 | 6/1985 | European Pat. Off. . | |
| 0552970 | 7/1993 | European Pat. Off. . | |
| 3722927 | 1/1988 | Germany . | |
| 55-92088 | 7/1980 | Japan | 360/107 |
| 55-108925 | 8/1980 | Japan . | |
| 56-51021 | 5/1981 | Japan | 360/107 |
| 58-98850 | 6/1983 | Japan . | |
| 61-52532 | 11/1986 | Japan . | |
| 110410 | 1/1989 | Japan | 360/107 |
| 312022 | 1/1991 | Japan | 360/77.16 |
| 4-10211 | 1/1992 | Japan | 360/107 |
| 4121814 | 4/1992 | Japan . | |
| 58486 | 2/1993 | Japan . | |
| 581631 | 4/1993 | Japan . | |

*Primary Examiner*—Stuart S. Levy
*Assistant Examiner*—David L. Ometz

[57] ABSTRACT

A shaft is fixed on a fixed drum, and a rotary drum is supported rotatably on the shaft. Parallel plate springs are supported by the rotary drum, and at movable portions of the plate springs, a permanent magnet is gripped and a magnetic head is supported. A yoke having a wall surface opposing to both side surfaces of the permanent magnet with a prescribed distance therebetween is fixed on the fixed drum. A first coil is mounted and fixed to oppose to one side surface of the permanent magnet with a prescribed space, and a second coil is attached and fixed to oppose to the other side surface with a prescribed space therebetween, on the yoke. Accordingly, responsiveness in dynamic tracking operation at the time of signal reproduction can be improved, and vibration of the magnetic head during signal recording can be prevented.

4 Claims, 28 Drawing Sheets

ROTARY HEAD TYPE MAGNETIC RECORDING REPRODUCING APPARATUS

This application is a divisional of application Ser. No. 08/464,078, fled on Jun. 5, 1995, U.S. Pat. No. 5,694,273 the entire contents of which are hereby incorporated by reference.

BACKGROUND OF THE INVENTION

1. Field of the Invention

The present invention relates to a rotary head type magnetic recording reproducing apparatus and, more specifically, to a rotary head type magnetic recording reproducing apparatus including an actuator for dynamic tracking of a helical scan type video cassette recorder.

2. Description of the Background Art

Recently, as the density of recording becomes greater and greater, the tracks become narrower and narrower in a magnetic recording reproducing apparatus. For example, in an LP (Long Playing) mode of a digital VCR for family use, the track pitch is expected to be about 5 μm. As the track width becomes narrower and narrower, requirements of a magnetic head for satisfactory tracking operation becomes more severe. More specifically, in a magnetic recording reproducing apparatus of a conventional type in which a magnetic head is fixed on a rotary drum so that it cannot move in the widthwise direction of the track, influence of tracking deviation is conspicuous when signals are reproduced from narrow tracks. As a result, reproduction output from the magnetic head is not sufficient.

A so called track curve generated at the time of recording may be a cause of such tracking deviation. This track curve is unique in each magnetic recording reproducing apparatus. Therefore, when tracks recorded by one magnetic recording reproducing apparatus are reproduced by another apparatus, the tracking deviation derived from track curves is not negligible. Therefore, at the time of reproduction, a magnetic head must follow the track curve, in other words, dynamic tracking operation is necessary. A conventional rotary head type magnetic recording reproducing apparatus having an actuator for dynamic tracking will be described.

FIGS. 22 and 23 are a cross section and an exploded perspective, respectively, schematically showing a rotary head type magnetic recording reproducing apparatus including a mechanism similar to a moving magnet type dynamic tracking mechanism disclosed in Japanese Patent Publication No. 5-8486.

Referring to FIGS. 22 and 23, a rotary head type magnetic recording reproducing apparatus 800 includes a fixed drum 830, a rotation axis 821 rotatably supported by two bearings 823, 823 provided at a boss portion of fixed drum 830, a rotary drum 840 supported integrally rotatable with rotation axis 821, a dynamic tracking mechanism, and rotary transformers 831 and 833.

The dynamic tracking mechanism includes magnetic heads 801a and 801b, head bases 803a and 803b, parallel plate springs 805a and 805b, permanent magnets 807a and 807b, fixed members 811, 811, yokes 813a and 813b, and a coil 815.

The first plate spring 805a constituting the parallel plate springs is fixed on rotary drum 840 by means of fixed members 811, 811 (FIG. 23). The second plate spring 805b constituting the parallel plate springs 15 also supported by rotary drum 840, gripping fixed member 811, 811 together with the first plate spring 805a.

Yokes 813a, 813b are gripped by parallel plate springs 805a and 805b so that the yokes oppose each other with rotation axis 821 interposed. Yokes 813a and 813b are of a soft magnetic material. Permanent magnets 807a and 807b are attached on yokes 813a and 813b at surfaces on the side of rotation axis 821, respectively. Permanent magnet 807a and yoke 813a serve as a movable member 808a of parallel plate springs 805a and 805b, and permanent magnet 807b and yoke 813b serve as a movable member 808b.

Magnetic heads 801a and 801b are attached on movable members 808a and 808b through head bases 803a and 803b, respectively. Magnetic heads 801a and 801b are arranged so as to face outer peripheral surfaces of fixed drum 830 and rotary drum 840.

Driving coil 815 is wound on an outer periphery of a stator 836 of fixed drum 830 so as to be spaced by a prescribed distance from each of the permanent magnets 807a and 807b. The stator 836 consists of a yoke of soft magnetic material, and constitutes, together with permanent magnets 807a, 807b and yokes 813a and 813b, a magnetic circuit.

Vibration characteristics of the actuator when magnetic heads 801a and 801b are supported by parallel plate springs 805a and 805b will be described.

FIGS. 24 and 25 are schematic diagrams showing vibration characteristics of the magnetic head supported by the parallel plate springs, as mentioned above, in which frequency response of displacement (output) in the Z direction of FIG. 22 of magnetic head 801a with respect to a supply current (input) to driving coil 815 is plotted. Specifically, FIG. 24 is a graph showing relation between frequency and gain, and FIG. 25 is a graph showing relation between frequency and phase.

Referring to FIGS. 24 and 25, there are high order resonance points in the vibration characteristics of the magnetic head, as magnetic head 801a is supported by parallel plate springs 805a and 805b. It is noted in this structure that there is considerable rotational vibration in the RY direction of FIG. 22, of the aforementioned high order resonance points.

FIG. 24 shows an example in which the rotational vibration appears as a second order resonance point. More specifically, a first order resonance point (frequency $f_1$) corresponds to vibration in the Z direction of FIG. 22, while the second order resonance point (frequency $f_2$) corresponds to rotational vibration in the RY direction of FIG. 22. In such a structure, the center of rotation in the RY direction approximately coincides with the center of gravity of the movable member 808a. In FIGS. 24 and 25, resonance points of third and higher orders are omitted.

At the time of signal recording and reproducing, general tracking operations of the drum apparatus shown in FIG. 22 will be described in the following.

[Operation in signal reproduction]

FIG. 26 shows a control block diagram showing closed loop control at the time of signal reproduction. Referring to FIG. 26, a control signal is inputted to driving coil 815 through an amplifier 850, a phase compensating circuit 851 and a driver 852.

Permanent magnet 807a is arranged such that its magnetic flux intersects driving coil 815. Therefore, when a current is supplied to driving coil 815, upward and downward driving force acts on permanent magnet 807a, because of Fleming's left-hand rule. As a result, movable member 808a including permanent magnet 807a is displaced to a position where the driving force is balanced with the reaction of parallel plate springs 805a and 805b. Therefore, by applying a control current to driving coil 815, the height of magnetic head 801a attached on movable member 808a can be controlled.

Here for example, information with respect to the height of the magnetic head can be detected by a pilot signal reproduced by the magnetic head. The information obtained here is the relative position of the magnetic head with respect to a track on a magnetic tape. In this method of detection, pilot signals having different frequencies for different tracks are recorded superimposed on main signals, at the time of signal recording. At the time of reproduction, the magnetic head extracts pilot signal components from tracks on both sides of a track to be scanned, the components are compared, and relative position with respect to the track to be scanned is detected. By feedback of the information, the magnetic head can follow the track. Dynamic tracking operation is thus performed.

Transmission of the signal at the magnetic head is performed by rotary transformers 831 and 833.

[Operation in signal recording]

At the time of signal recording, dynamic tracking operation is not performed, and magnetic heads 801a and 801b are supported by the stiffness of parallel plate springs 805a and 805b.

(A) When a rubber member is used for supporting the magnetic head, mechanical properties (Young's modulus, coefficient of viscosity) of the rubber member change because of aging and change in temperature, and therefore highly accurate control is difficult.

In order to realize highly accurate control, parallel plate springs 805a and 805b are used as the magnetic head displacement means in the conventional rotary head type magnetic recording reproducing apparatus such as described above. However, the conventional rotary head type magnetic recording reproducing apparatus suffers from the following problem, because of the use of parallel plate springs 805a and 805b.

(1) Responsiveness in dynamic tracking operation is poor at the time of signal reproduction.

(2) Magnetic head vibrates at the time of signal recording.

The problems will be described in greater detail.

(1) As to responsiveness in dynamic tracking operation.

Recently, as the speed of data transfer is increased and drum diameter has been made smaller, the number of rotation of the drum comes to be higher and higher. In a digital VCR for family use, for example, the number of rotation of the drum is 9000 rpm. With such high number of rotation of the drum, the response frequency of dynamic tracking must be increased so as to follow the track curve.

FIG. 27 is a graph showing relation between gain and frequency of open loop transfer function in the block diagram of FIG. 26. FIG. 28 is a graph showing relation between the frequency and the phase. Here, the input is the point M and the output is the point N of FIG. 26.

Referring to FIGS. 27 and 28, in the conventional rotary head type magnetic recording reproducing apparatus, there are high order resonance points in vibration characteristics, as the magnetic head is supported by parallel plate springs. The phase delay of frequency at which the first order resonance occurs can be avoided by phase compensation (FIG. 26). By contrast, it is difficult to avoid phase delay near the frequency $f_2$ at which second order resonance occurs. Accordingly, there is generated a phase delay of about 180°. In other words, the frequency (phase crossover frequency) $f_c$ at which the phase delays by 180° is positioned near the second order resonance frequency $f_2$ ($f_0 \approx f_2$).

Generally, oscillation occurs when the phase is delayed by about 180° and the gain is 0 dB. Therefore, the peak at the second order resonance point causing phase delay of about 180° must be positioned below the gain 0 dB, in order to ensure gain margin.

The gain crossover frequency $f_c$ which is the crossing point of gain-frequency curve and gain 0 dB is determined under such restriction. Operation of the magnetic head can be controlled at a frequency which is lower than the gain crossover frequency $f_c$. More specifically, the response frequency of dynamic tracking is represented by gain crossover frequency $f_c$.

The gain-frequency curve of FIG. 27 can be moved in the upward or downward direction by gain adjustment of an amplifier. However, because of the restriction mentioned above, gain adjustment of the amplifier is limited, and as a result, the gain crossover frequency $f_c$, that is, response frequency of dynamic tracking, is limited. Therefore, when the number of rotation of the drum is very high, track curve cannot be followed, and therefore responsiveness in dynamic tracking operation is poor.

Therefore, the gain cross frequency $f_c$ (response frequency of dynamic tracking) of FIG. 27 should be as high as possible. The gain crossover frequency $f_c$ can be made higher by <1> making higher the second order resonance frequency $f_2$, or by <2> making lower a peak value (gain value) at the second order resonance point $f_2$.

More specifically, when the second order resonance frequency is increased from $f_2$ to $f_{21}$ as shown in FIG. 29, the gain crossover frequency is increased from $f_c$ to $f_{c1}$, as the gain-frequency curve can be adjusted upward in the figure. When the peak value at the second order resonance point is made lower as shown in FIG. 30, the gain crossover frequency can be increased from $f_c$ to $f_{c2}$ in the similar manner.

<1> Referring to FIG. 22, in optimizing the design of parallel plate springs 805a and 805b, increase of the second order resonance frequency while maintaining the first order resonance frequency is limited because of various restrictions including space. Therefore, in order to significantly increase the second order resonance frequency, the first order resonance frequency must be increased as well. In order to increase the first order resonance frequency, stiffness of the parallel plate springs 805a and 805b in the Z direction must be increased, or the mass of movable portions 808a and 808b must be reduced.

However, when stiffness of parallel plate springs 805a and 805b is increased, the first and higher order resonance frequencies are increased, while displacement of parallel plate springs 805a and 805b in the Z direction is suppressed. Therefore the amount of displacement equal to that of the prior example cannot be obtained unless driving force of the magnetic head is increased.

When the permanent magnets 807a and 807b are reduced in size in order to reduce mass of the movable portions 808a and 808b, magnetic flux intersected with driving coil 815 reduces. This causes reduction in driving force, and therefore amount of displacement equal to the prior example cannot be obtained.

In view of the foregoing, in order to increase first order and higher order resonance frequencies while maintaining the same amount of displacement as in the prior art example, driving force must be increased. However, in order to increase driving force of the structure shown in FIG. 22, a large current must be supplied to driving coil 815, resulting in increased power consumption and heat radiation.

<2> In order to lower the peak of the second order resonance point, it is necessary to reduce moment in the RY direction generated by the driving force acting on permanent magnets 807a and 807b. In order to reduce moment in the RY direction by the driving force, the acting point of the driving force should be brought near to the center of rotation (center of gravity of movable members 808a and 808b). However, in the structure shown in FIG. 22, the driving force acts only on one magnetic pole of permanent magnets 807a, 807b. Therefore, the point of action of the driving force cannot be brought near to the center of rotation unless thickness in the radial direction of yokes 813a, 813b and permanent magnets 807a and 807b is reduced. However, reduction in thickness in the radial direction of permanent magnets 807a, 807b and the like is limited because of restrictions in processing and assembly. Therefore, it is difficult to reduce the thickness in the radial direction of permanent magnets 807a and 807b, and hence it is difficult to reduce the moment in the RY direction by the driving force.

Because of the reasons <1> and <2> above, it was very difficult to increase the second order resonance frequency and to reduce peak value at the second order resonance point in the structure of FIG. 22. Accordingly, when the number of rotation of the drum is high, track curve cannot be followed and responsiveness in dynamic tracking operation is not satisfactory.

(2) As to vibration of magnetic head at the time of signal recording

Referring to FIG. 22, in order to suppress vibration of magnetic heads 801a and 801b, it is effective to increase stiffness of parallel plate springs 805a and 805b. However, when stiffness of parallel plate springs 805a and 805b is increased, deformation of plate springs 805a and 805b at the time of signal reproduction becomes difficult, and therefore the amount of displacement equivalent to that in the prior art cannot be obtained unless the driving force is increased. In the structure shown in FIG. 22, it is necessary to supply a large current to driving coil 815 in order to increase the driving force, resulting in increased power consumption and heat radiation. Therefore, it was difficult to prevent vibration of magnetic head during signal recording while maintaining small power consumption and small heat radiation during signal reproduction.

When a rubber member (dumper member) is used as magnetic head displacement means, consideration of resonance point in the control system is almost unnecessary, as the peak of resonance point of the rubber member is very small as compared with the parallel plate springs.

(B) In the prior art example shown in FIG. 22, there is a difference in heights in magnetic heads 801a and 801b when current is not supplied to driving coil 815, because of variation in attachment of respective members during assembly of the rotary head type magnetic recording reproducing apparatus (for example, attachment of magnetic heads 801a, 801b on head bases 803a, 803b; attachment of head bases 803a, 803b on movable members 808a, 808b; and attachment of parallel plate springs 805a and 805b on rotary drum 840).

When the height of magnetic head 801a, 801b from a reference point of the apparatus (hereinafter referred to as an absolute height) deviates from a prescribed height (hereinafter referred to as a standard height), recording/ reproduction in a prescribed tape format becomes impossible, hindering compatibility of apparatuses. When relative height of two magnetic heads 801a and 801b hereinafter referred to as a relative height differ from each other, it becomes impossible to record signals at a prescribed track pitch.

A structure proposed to solve this problem is disclosed in Japanese Patent Publication No. 61-52532 and in Japanese Patent Laying-Open No. 4-121814. The structures shown in these articles have different structures for dynamic tracking operation from the prior art technique shown in FIGS. 22 and 23.

<1> Japanese Patent Publication No. 61-52532 discloses a moving magnet mechanism which performs a seesaw like operation. More specifically, two sets of magnetic heads perform a seesaw like operation as DC bias current is supplied to the driving coil, and thus relative height of two sets of magnetic heads is adjusted.

However, in the above described structure, absolute height of the magnetic head cannot be adjusted. Further, the magnetic head displacement means must ensure an amount of displacement necessary for dynamic tracking operation as well as an amount of displacement necessary for absorbing difference in relative height derived from variation in attachment of the magnetic head. Therefore, extra driving force is necessary, current consumption is increased and heat radiation of the driving coil is increased. Further, if the above structure is used as it is, the magnetic head is inclined as it performs a seesaw like operation, and contact between the head and the tape becomes less satisfactory.

<2> Japanese Patent Laying-Open No. 4-121814 discloses a dynamic tracking mechanism using a bimorph plate. More specifically, height of a magnetic head is adjusted by suppressing downward a support member by means of a screw, with the magnetic head support member formed of a bimorph plate receiving upward driving force. At the time of signal recording, the magnetic head support member receives upward driving force, so that it is brought into contact with the screw. The dynamic tracking operation in signal reproduction is performed with the magnetic head support member apart from the screw.

However, even when this structure is applied to the prior art technique described above (FIGS. 22, 23), large driving force must be supplied in signal recording, resulting in increased power consumption. Further, in view of processing accuracy in magnetic head supporting member and the screw, and in view of deterioration of contact state because of aging, there is not high reproductivity of the magnetic head height at the time of signal recording. More specifically, difference in height of the magnetic head caused by aging during signal recording cannot be adjusted.

Because of the reasons <1> and <2> above, it was difficult to adjust the height of the magnetic head in the prior art.

SUMMARY OF THE INVENTION

An object of the present invention is to improve responsiveness in dynamic tracking operation during signal reproduction.

Another object of the present invention is to suppress vibration of a magnetic head during signal recording.

A further object of the present invention is to facilitate adjustment of the height of the magnetic head.

The rotary head type magnetic recording reproducing apparatus in accordance with one aspect of the present invention includes a fixed drum,, a rotor, first and second plate springs, a magnetic head, a movable member, a yoke, and first and second coils. The fixed drum has an axis. The rotor includes a rotary drum supported, on the fixed drum, rotatably about the axis. The first and second plate springs each have a movable portion and a fixed portion, with the fixed portion supported on the rotor so that the movable portion can be displaced in a direction along the axis. The first and second plate springs oppose to each other with a prescribed distance therebetween. The magnetic head is fixedly attached on the movable portion of the first plate spring. The movable member includes a permanent magnet having first and second magnetic poles, gripped by the movable portion of the first plate spring and the movable portion of the second plate spring. The yoke has first and second side surfaces, and arranged on the fixed drum such that the first side surface opposes to the first magnetic pole of the permanent magnet with a prescribed space and the second side surface opposes to the second magnetic pole of the permanent magnet with a prescribed space. The first coil is attached on the first side surface of the yoke so as to oppose to the first magnetic pole of the permanent magnet with a prescribed space. The second coil is attached on the second side surface of the yoke to oppose to the second magnetic pole of the permanent magnet with a prescribed space. The permanent magnet and the first and second coils are arranged such that the magnetic head moves in a direction along the axis when currents are supplied to the first and second coils.

In the rotary head type magnetic recording reproducing apparatus in accordance with one aspect of the present invention, since first and second coils are provided opposing to both side surfaces of the permanent magnet, driving force can act on both side surfaces of the permanent magnet. Therefore, as compared with the prior art in which driving force acts only on one surface of the permanent magnet, larger driving force can be obtained. Since driving force is large, the parallel plate springs can be sufficiently displaced even when stiffness of the parallel plate springs is increased. Therefore, first and higher order resonance frequencies can be increased, improving responsiveness in dynamic tracking.

In addition, since the stiffness of the plate spring can be increased, vibration of the magnetic head at the time of recording can also be suppressed.

Further, since a yoke constituting the magnetic circuit is arranged on the fixed drum, mass of the movable portion of the parallel plate springs can be reduced as compared with the prior art in which the yoke is supported by the parallel plate springs. Accordingly, the first order and the higher order resonance frequencies can be increased, and responsiveness in dynamic tracking can further be improved.

Further, since driving force can act on both side surfaces of the permanent magnet, an action of the moment in the rotational direction on the movable portion of the parallel place springs can be prevented when driving forces acting on both side surfaces are made equal. This enables reduction in peak value of the gain in rotational resonance, further improving responsiveness in dynamic tracking.

In a rotary head type magnetic recording reproducing apparatus in accordance with a preferred aspect of the present invention, the movable member includes a shield plate formed of a soft magnetic material. The first plate spring has a first surface and a second surface positioned on the rear side of the first surface. The magnetic head is supported by the first surface of the first plate spring. The permanent magnet is supported by the second surface of the first plate spring with the shield plate interposed.

In the rotary head type magnetic recording reproducing apparatus in accordance with a preferred aspect of the present invention, the permanent magnet is attached on the plate spring with the shield plate interposed. Since the shield plate is formed of a soft magnetic material, leakage flux from the permanent magnet is absorbed by the shield plate. Therefore, leakage flux from the permanent magnet does not affect the magnetic head.

In a rotary head type magnetic recording reproducing apparatus in accordance with another preferred aspect of the present invention, the yoke has an arcuate shape with the axis being the center.

In the rotary head type magnetic recording reproducing apparatus in accordance with a still further preferred aspect of the present invention, a magnetic tape is wrapped around an outer peripheral surfaces of the rotary drum and the fixed drum. The central angle of the yoke having the arcuate shape is set such that of one rotation of the magnetic head, in the section where magnetic head is scanning the magnetic tape, at least the first and second magnetic poles of the permanent magnet which corresponds to the magnetic head scanning the magnetic tape are opposed to the first and the second side surfaces of the yoke with a prescribed space therebetween.

In the rotary head type magnetic recording and reproducing apparatus in accordance with the preferred two aspects of the present invention described above, the yoke has an arcuate shape and it is provided not over the entire periphery. Therefore, as compared with an example in which the yoke is provided over the entire periphery, there is made a space in the fixed drum. By utilizing this space, various other functions and higher functions may be provided while maintaining the overall size.

A rotary head type magnetic recording reproducing apparatus according to a further aspect of the present invention includes a fixed drum, a rotor, first and second plate springs, a magnetic head, a movable member, driving means, a plate spring pressing member and a head height adjusting member. The fixed drum is centered about an axis. The rotor includes a rotary drum which is supported on a fixed drum so as to be rotatable about the axis. The first and second plate springs each have a movable portion and a fixed portion, and the fixed portion is supported by the rotor such that the movable portion can be displaced in a direction along the axis. The first and the second plate springs oppose to each other with a prescribed distance therebetween. The magnetic head is fixedly mounted on the movable portion of the first plate spring. The movable member is gripped by the movable portion of the first plate spring and the movable portion of the second plate spring. The driving means displaces the movable portions of the first and second plate springs in a direction along the axis. The plate spring pressing member is supported on the rotor so that an intermediate portion between the movable portion and the fixed portion of the first and second plate spring can be pressed in a direction along the axis. The head height adjusting member is gripped between an intermediate portion of the first plate spring and an intermediate portion of the second plate spring.

In the rotary head type magnetic recording reproducing apparatus according to the aforementioned further aspect of the present invention, absolute height of the magnetic head at the time of assembly of the drum apparatus can be adjusted by pressing a prescribed position of the plate spring, by means of the plate spring pressing member.

In the rotary head type magnetic recording reproducing apparatus in accordance with a preferred aspect of the present invention, the width of the first plate spring in the radial direction of a rotary plane about the axis is wider than the width of the second plate spring in the radial direction.

In the rotary head type magnetic recording reproducing apparatus in accordance with the aforementioned preferred aspect of the present invention, the first plate spring constituting the parallel plate springs has wider width in the radial direction than the second plate spring. This facilitates attachment of the magnetic head on the first plate spring during assembly of the drum apparatus. Further, since the width in the radial direction of the first plate spring is wide, the first plate spring has improved stiffness, thus suppressing vibration of the magnetic head.

In a rotary head type magnetic recording reproducing apparatus according to another preferred aspect of the present invention, two sets of magnetic head groups including one or a plurality of magnetic heads and two sets of movable members including a permanent magnet are provided. Each of the two sets of magnetic head groups is provided for each of the two sets of movable members. Both of the two sets of permanent magnets are adapted such that the first magnetic pole of a permanent magnet corresponding to one magnetic head group and a first magnetic pole of a permanent magnet corresponding to the other magnetic head group are different from each other, and a second magnetic pole of the permanent magnet corresponding to one magnetic head group and a second magnetic pole of the permanent magnet corresponding to the other magnetic head group are different from each other, with the magnetic pole nearer to the axis being referred to the first magnetic pole and the magnetic pole distant from the axis being referred to the second magnetic pole. The two sets of permanent magnets and the first and second coils are arranged such that two sets of magnetic head groups are displaced in opposite directions when current is supplied to the first and second coils.

In the rotary head type magnetic recording reproducing apparatus in accordance with the aforementioned further preferred aspect of the present invention, two sets of permanent magnets have opposite magnetizing directions. Therefore, by supplying a DC bias current to the driving coil, a magnetic head group at a relatively high position can be displaced downward while the magnetic head group at a relatively low position can be displaced upward, and thus the relative height of the two sets of magnetic head groups can be adjusted.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of the present invention will be described with reference to the figures.

First Embodiment

Figure 1:
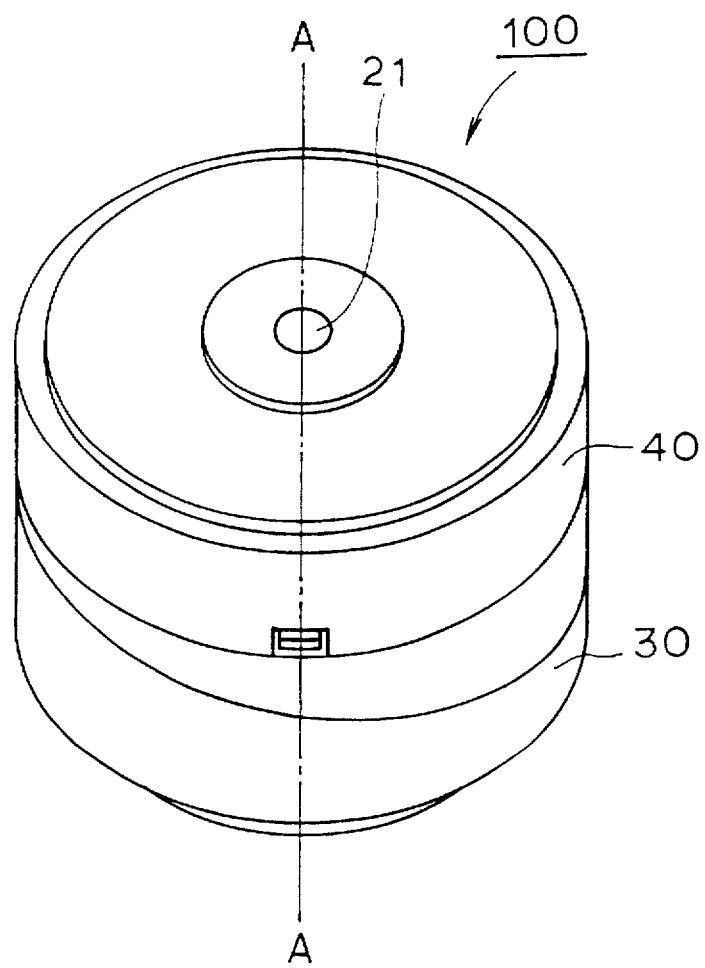
FIG. 1 is a perspective view schematically showing a structure of a rotary head type magnetic recording reproducing apparatus in accordance with a first embodiment of the present invention.
Figure 2:
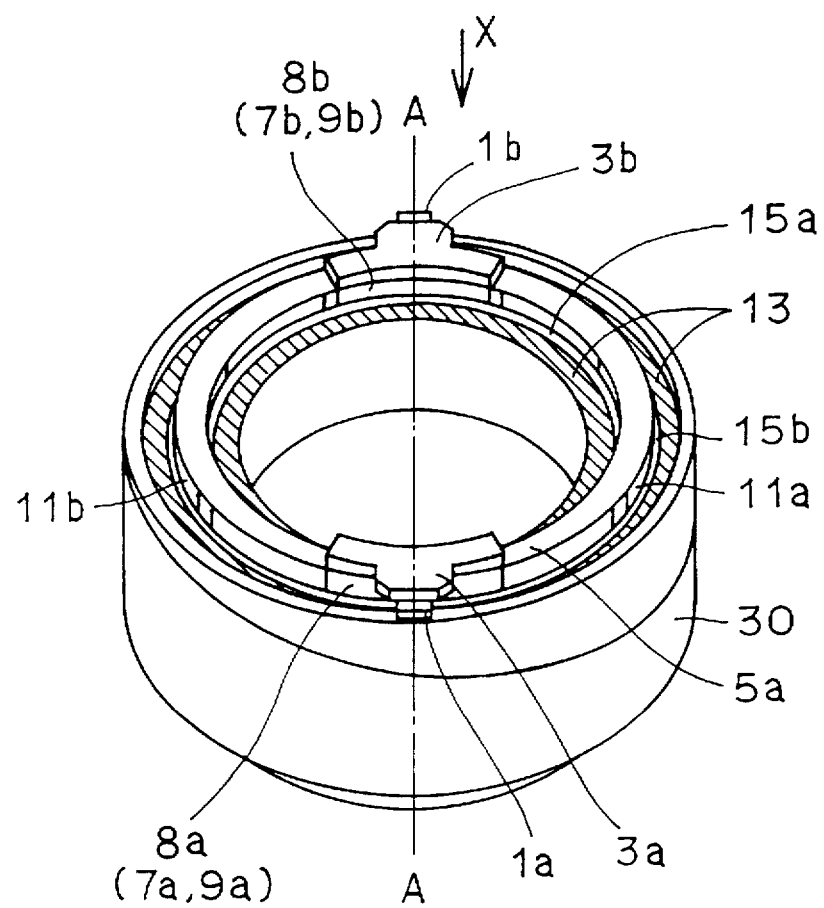
FIG. 2 is a schematic perspective view showing the apparatus of FIG. 1 with a rotary drum, a shaft and a motor removed.

First, referring to FIG. 1, in a rotary head type magnetic recording reproducing apparatus 100 of the present embodiment, a shaft 21 having an axis A—A is fixed at the center of a cylindrical fixed drum 30. A cylindrical rotary drum 40 is supported on shaft 21 so as to be rotatable about the axis A—A.

Figure 5:
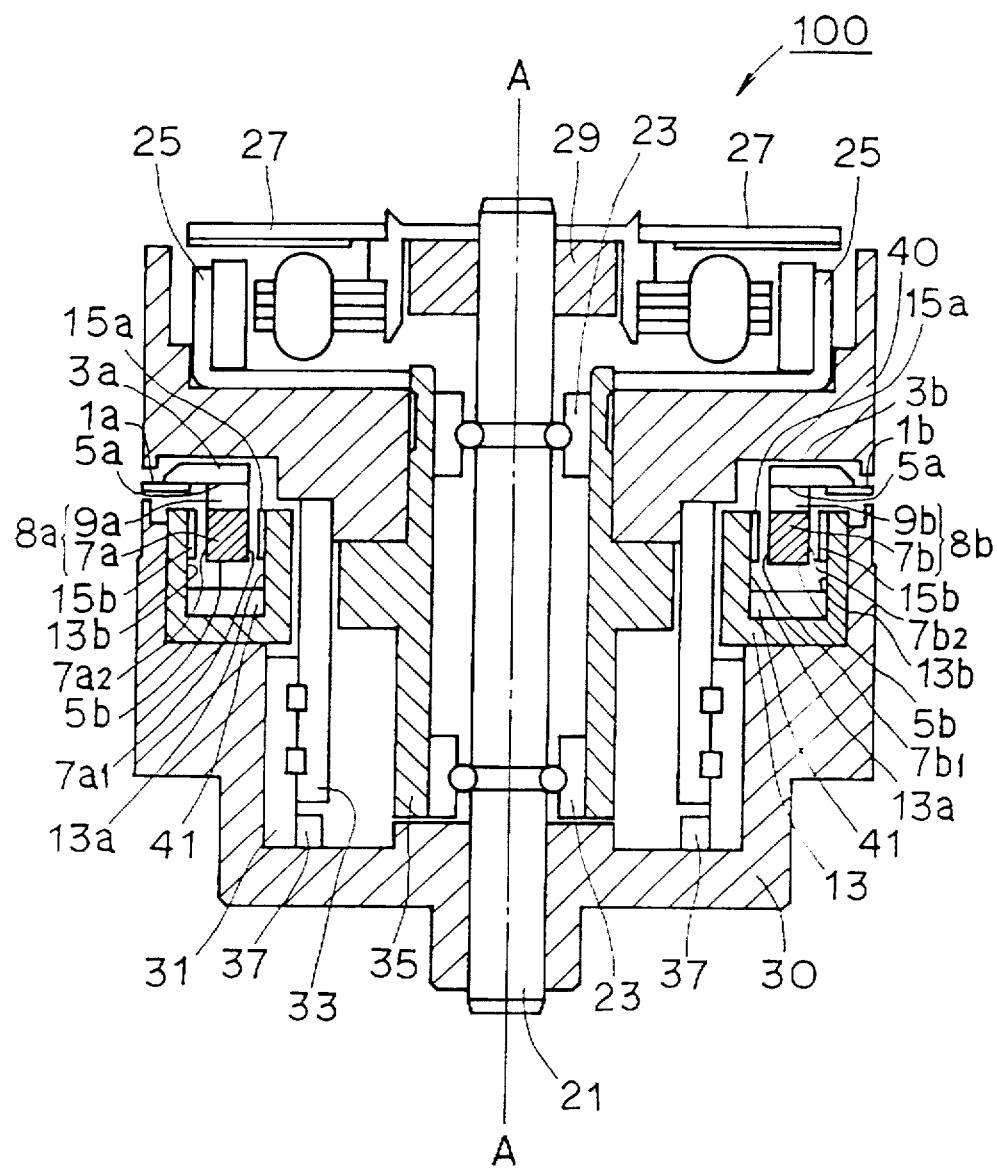
FIG. 5 is a schematic cross section corresponding to the section along the line B—B of FIGS. 3 and 4, of the rotary head type magnetic recording reproducing apparatus of the first embodiment of the present invention.
Figure 6:
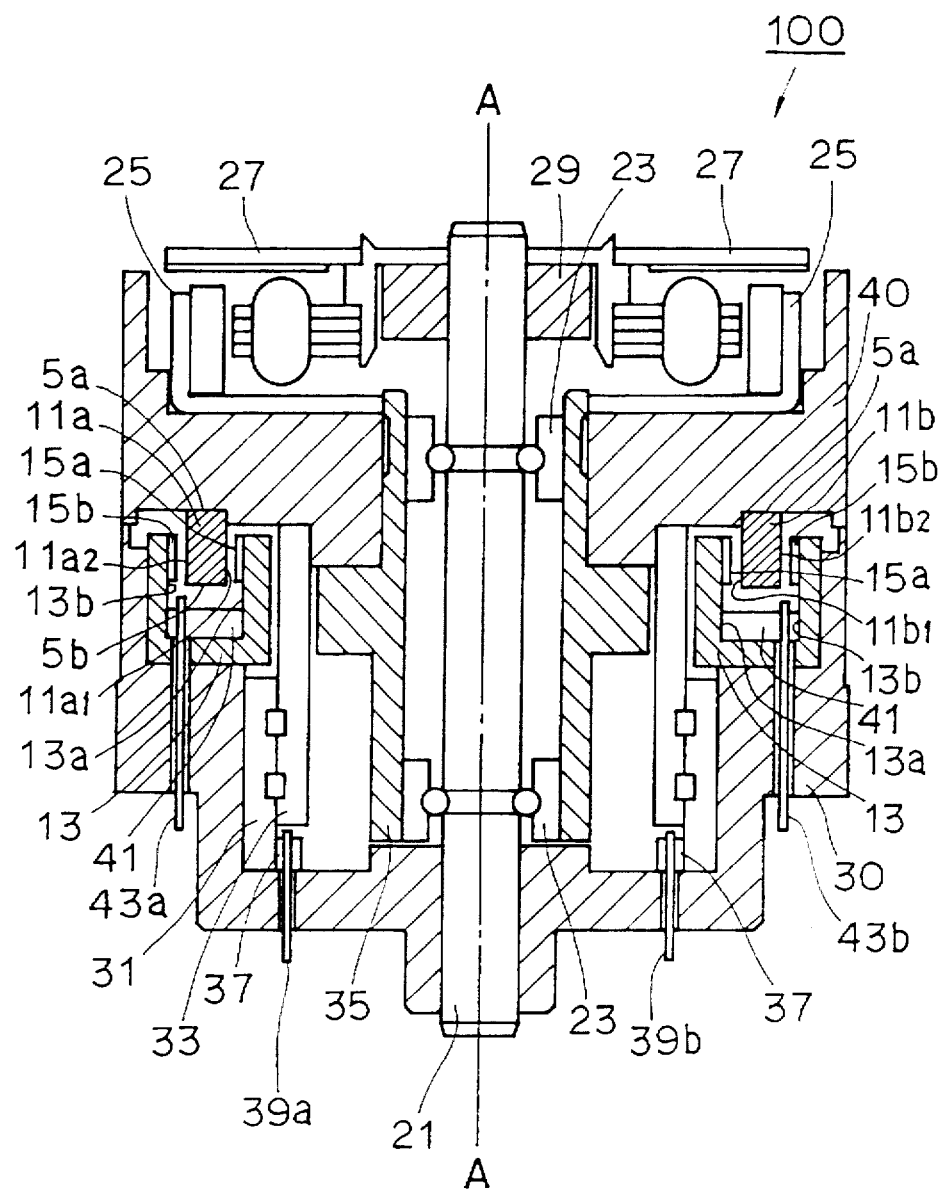
FIG. 6 is a schematic cross section corresponding to a section along the line C—C of FIGS. 3 and 4 of the rotary head type magnetic recording reproducing apparatus in accordance with the first embodiment of the present invention.

Referring to FIGS. 5 and 6, the rotary drum 40 is mounted on a disc 35, which disc 35 is mounted on an outer periphery of a pair of upper and lower outer bearings 23.

On fixed drum 30, rotary drum 40 and shaft 21 arranged in this manner, mainly a motor, a rotary transformer and a dynamic tracking mechanism are mounted.

Referring to FIGS. 5 and 6, the motor has a rotor 25 and a stator 27. The rotor 25 is mounted on rotary drum 40, while the stator 27 is mounted on shaft 21. Driving force for rotation is applied to rotary drum 40 by the motor consisting of rotor 25 and stator 27.

The rotary transformer has a stator core 31 and a rotor core 33. Rotor core 33 is mounted on rotary drum 40, and stator core 31 is mounted on fixed drum 30.

Mainly referring to FIGS. 3 to 6, the dynamic tracking mechanism includes magnetic heads 1a, 1b, head bases 3a, 3b, parallel plate springs 5a, 5b, permanent magnets 7a, 7b, spacers 9a, 9b, fixed members 11a, 11b, a yoke 13, and driving coils 15a and 15b.

Figure 7:
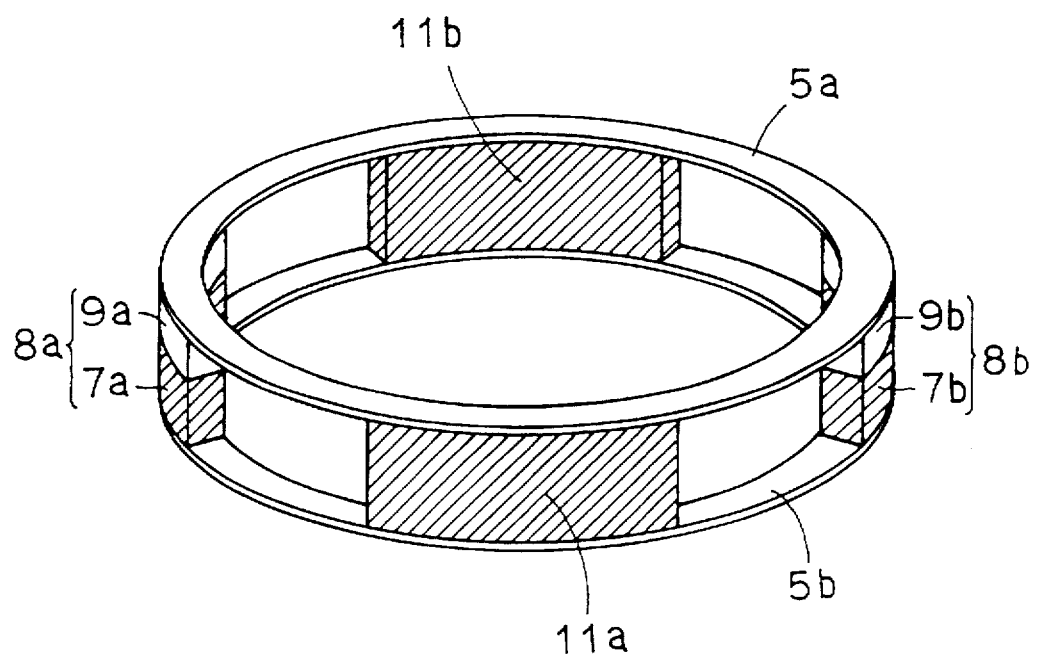
FIG. 7 is a perspective view schematically showing a structure of parallel plate springs and a member gripped therebetween, mounted on the rotary head type magnetic recording reproducing apparatus in accordance with the first embodiment of the present invention.

Mainly referring to FIG. 7, first and second plate springs 5a and 5b constituting parallel plate springs has a ring shape. Between the first and second plate springs 5a and 5b, movable members 8a, 8b and fixed members 11a and 11b are gripped. Movable members 8a and 8b are arranged opposing to each other, and fixed members 11a and 11b are arranged opposing to each other. Movable members 8a and 8b each have a layered structure including permanent magnets 7a, 7b and spacers 9a, 9b, respectively. The spacers 9a and 9b are formed of a non-magnetic material.

Mainly referring to FIG. 6, parallel plate springs 5a and 5b are fixed on rotary drum 40 at portions where fixed members 11a and 11b are attached.

Mainly referring to FIGS. 5 and 6, at this state, the portion where the movable members 8a and 8b are attached of parallel plate springs 5a and 5b are displacable with the portion of attachment of the fixed members 11a and 11b serving as the fixed ends. More specifically, movable members 8a and 8b of parallel plate springs 5a and 5b have a structure such as a movable member of a beam supported at both ends.

Figure 3:
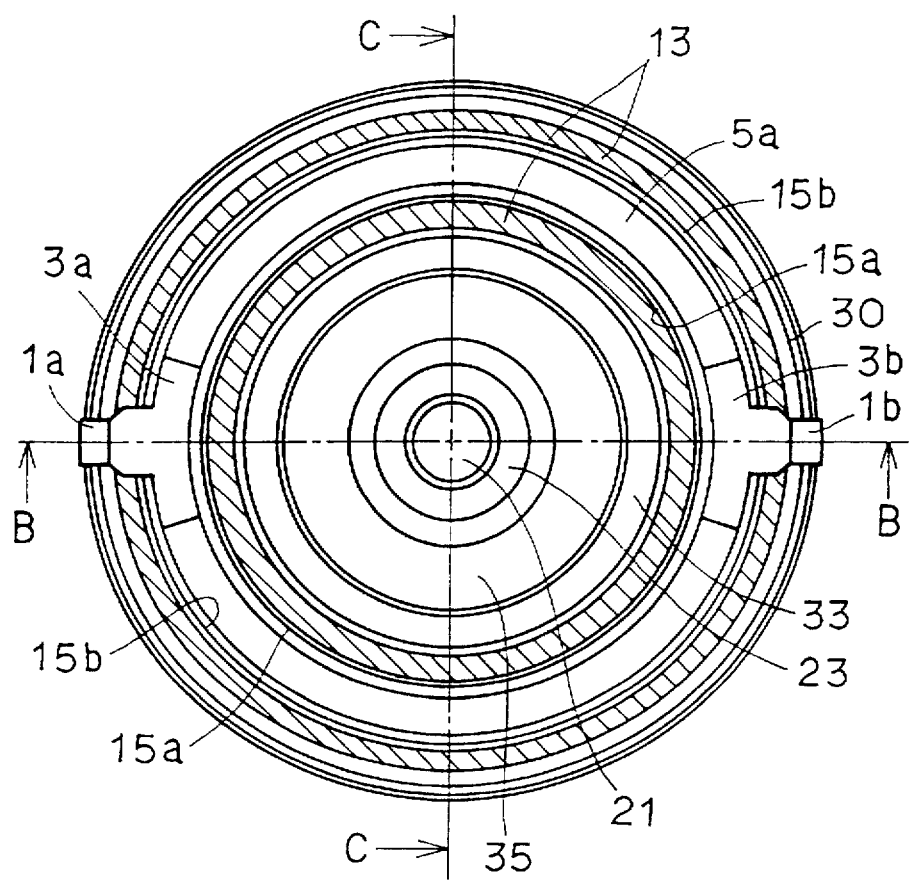
FIG. 3 is a schematic plan view taken from the direction of an arrow X of FIG. 2.
Figure 4:
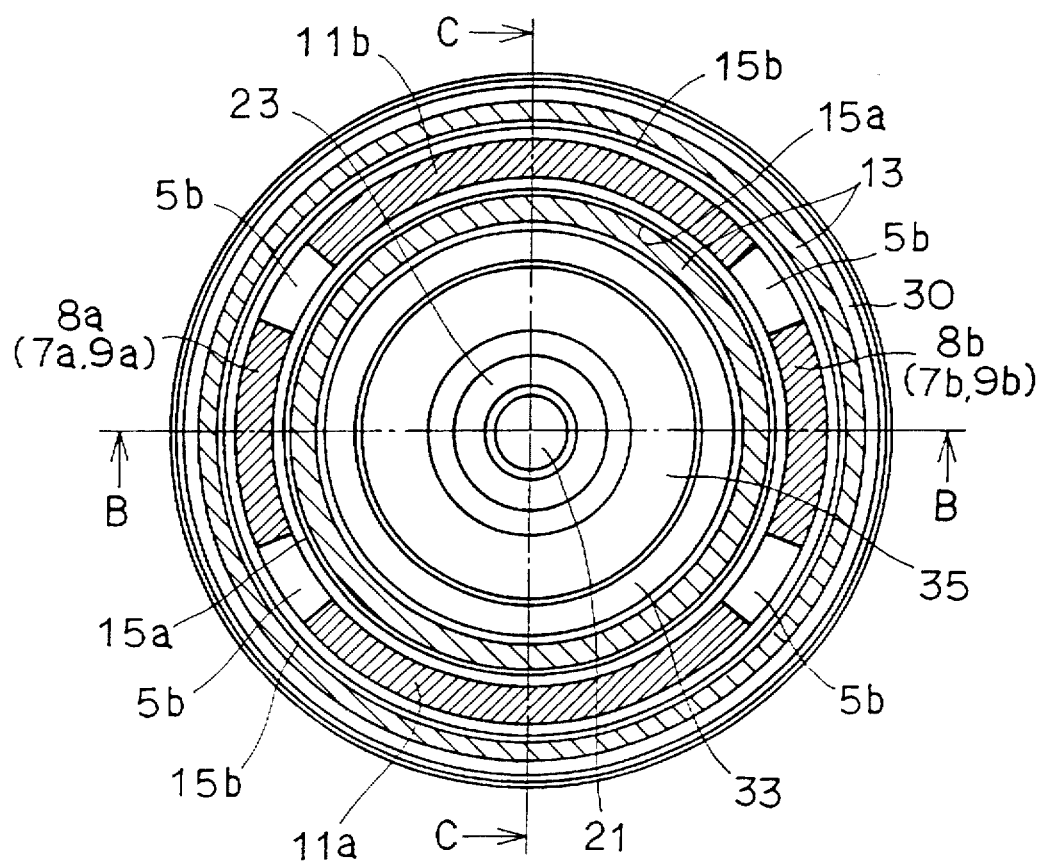
FIG. 4 is a schematic plan view showing the structure of FIG. 3 in which a magnetic head, a head base and a first plate spring are omitted.

Mainly referring to FIGS. 3 and 5, at portions of the first plate spring 5a where the movable members 8a and 8b are attached, magnetic heads 1a and 1b are mounted with head bases 3a and 3b being interposed, respectively. The magnetic heads 1a and 1b are arranged such that tip ends thereof face an outer peripheral surface of fixed drum 30 and rotary drum 40.

Referring to FIGS. 3 to 6, yoke 13 has a ring shape with a concave cross section, and attached on the fixed drum 30. Yoke 13 also has first and second side surfaces 13a and 13b providing side surfaces of the concave portion. Yoke 13 is arranged on fixed drum 30 such that the first side surface 13a opposes to one side surface $7a_1$, $7b_1$ of permanent magnets 7a, 7b with a prescribed space therebetween, and the second side surface 13b opposes to the other side surface $7a_2$, $7b_2$ of permanent magnets 7a, 7b with a prescribed space therebetween.

A first driving coil 15a is wound on the first side surface 13a of yoke 13 so as to oppose to one side surface $7a_1$, $7b_1$ of permanent magnets 7a, 7b, respectively, with a prescribed space. A second driving coil 15b is wound on the second side surface 13b of yoke 13 so as to oppose to the other side surface $7a_2$, $7b_2$ of permanent magnets 7a, 7b with a prescribed space therebetween.

Yoke 13 constitutes, together with permanent magnets 7a, 7b, a magnetic circuit.

Mainly referring to FIG. 6, terminals 43a and 43b for connection to the driving coil are provided on fixed drum 30 with a terminal base 41 interposed. Terminals 39a and 39b connected to the wound coil of stator core 31 of the rotary transformer is provided on fixed drum 30 with a terminal base 37 interposed. There are a plurality of terminals 43a and 43b, including those not shown, connected to driving coils 15a and 15b. Driving coils 15a and 15b may be connected to each other.

The stator core 31 of the rotary transformer is arranged below yoke 13 so as to reduce the radius of fixed drum 30.

Though fixed members 11a and 11b are shown as fixed on rotary drum 40, they may be fixed on a disc 35.

Though one magnetic head is attached on one movable member in this example, a plurality of magnetic heads may be attached on one movable member.

As for spacers 9a and 9b, they are necessary to provide spaces as magnetic heads 1a and 1b are fixed on lower surfaces in the figure of head bases 3a and 3b. Namely, when magnetic heads 1a and 1b are fixed on upper surfaces in the figure of head bases 3a and 3b, spacers 9a and 9b may not be provided.

Though a drum apparatus with its axis fixed is shown as an example, the shape of the drum apparatus is not limited to this and a drum apparatus with its axis rotated may be used.

A method of assembly of the rotary head type magnetic recording reproducing apparatus of the present embodiment will be described.

Mainly referring to FIGS. 5 and 6, a shaft 21 rotatably supporting disc 35 is fixed on fixed drum 30 by press fitting or thermo fitting. Thereafter, rotary drum 40 is fixed on disc 35 which is rotatable about shaft 21. At this state, rotary drum 40 is held rotatable with respect to fixed drum 30. Then, rotor 25 of the motor is fixed at an upper surface of rotary drum 40, and a collar 29 is fixed on shaft 21. Finally, stator 27 of the motor is fixed on collar 29.

In the above described structure, rotary drum 40 substantially integral with rotor 25 of the motor rotates with respect to fixed drum 30 which is substantially integral with stator 27 of the motor, by the rotary driving force of the motor.

Basic operation of an actuator for tracking in the rotary head type magnetic recording reproducing apparatus of the present embodiment will be described. Since operation of magnetic head 1a is the same as that of magnetic head 1b, only the operation of magnetic head 1a will be described.

Figure 8:
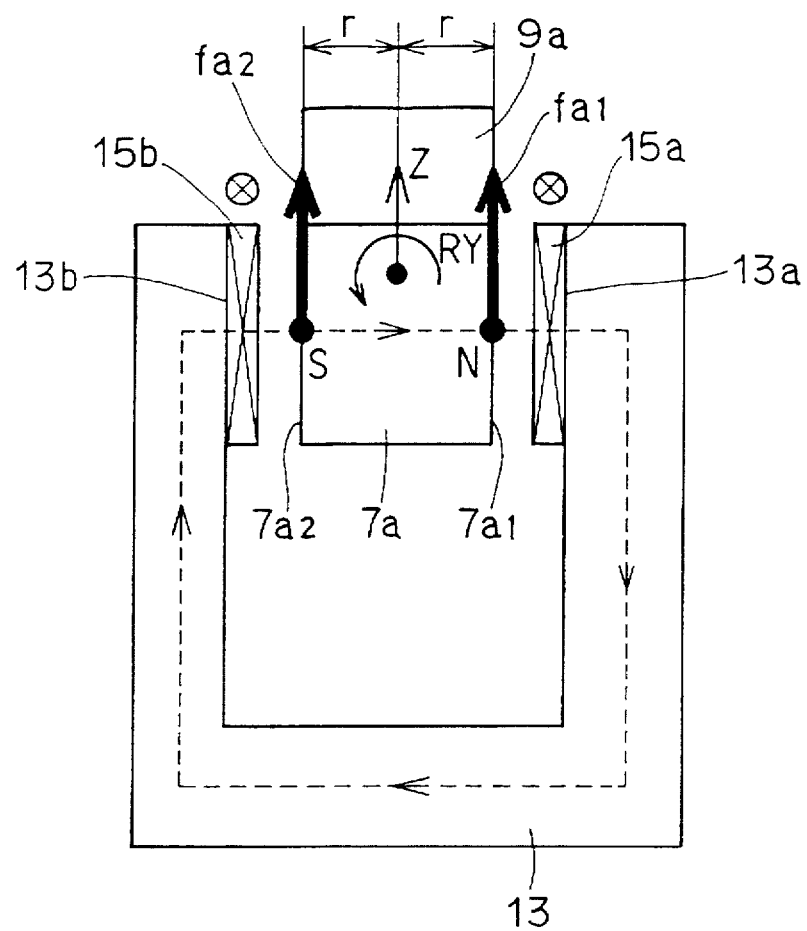
FIG. 8 is a schematic cross section showing, in enlargement, a portion of the cross section shown in FIG. 5.

Referring to FIGS. 5, 6 and 8, a portion of parallel plate springs 5a and 5b on which movable member 8a is attached is displacable in the upward and downward directions in the figure, with the portions of parallel plate springs 5a and 5b where fixed members 11a and 11b are attached serving as fixed ends. Magnetic head 1a is mounted at this portion of plate spring 5a where the movable member 8a is mounted, with a head base 3a interposed. Therefore, magnetic head 1a is displacable in the upward and downward directions (in a direction orthogonal to the plane of rotation).

Permanent magnet 7a is magnetized in the radial direction such that one side surface $7a_1$ serves as an N pole and the other side surface $7a_2$ serves as an S pole. Since these side surfaces $7a_1$ and $7a_2$ of permanent magnet 7a oppose to respective side surfaces 13a and 13b of yoke 13 having concave cross section with a prescribed space therebetween, a closed magnetic circuit is provided. Driving coils 15a and 15b are provided at the first and second side surfaces 13a and 13b of yoke 13 such that they are crossed with the magnetic flux generated from permanent magnet 7a.

Now, when currents of the same direction are supplied to the two driving coils 15a and 15b through terminals 43a and 43b, electromagnetic force $fa_1$ from driving coil 15a acts on one side surface $7a_1$ of permanent magnet 7a, and electromagnetic force $fa_2$ from driving coil 15b acts on the other side surface $7a_2$. The direction of action of electromagnetic forces $fa_1$ and $fa_2$ is the same.

Parallel plate springs 5a and 5b are displaced to a position where the electromagnetic force fa ($=fa_1+fa_2$) acting on permanent magnet 7a is balanced with the reaction of parallel plate springs 5a and 5b. Magnetic head 1a is also displaced in accordance with the displacement of parallel plate springs 5a and 5b.

By applying a control current to driving coils 15a and 15b in this manner, heights of magnetic heads 1a and 1b can be controlled.

When electromagnetic forces $fa_1$ and $fa_2$ are set such that $fa_1=fa_2$, the moment in the RY direction derived from the electromagnetic force hardly acts ($fa_1 \cdot r - fa_2 \cdot r = 0$). The center of rotation in the RY direction is near the center of gravity of movable member 8a.

In recording or reproducing signals specific operations of the actuator for tracking in the rotary head type magnetic recording reproducing apparatus of the present embodiment will be described.

[At the time of signal reproduction]

Relative positions of the recording track on the magnetic tape and magnetic heads 1a, 1b scanning the recording track are constantly detected by means of a pilot signal, for example. Based on the information, heights of magnetic heads 1a and 1b are constantly controlled, namely, dynamic tracking operation is performed.

[At the time of signal recording]

Signals are recorded in accordance with the method (1) or (2) below.

(1) Dynamic tracking operation is not performed, and magnetic heads 1a and 1b are supported by the stiffness of parallel plate springs 5a and 5b.

(2) By means of a magnetic head height detecting sensor, absolute height of magnetic head 1a or 1b during signal recording is constantly detected, and heights of magnetic heads 1a and 1b are constantly controlled based on the information. More specifically, dynamic tracking operation is performed. A known magnetic head height detecting sensor such as one of capacitance type, eddy current type or optical type may be used.

In the following description, it is assumed that dynamic tracking operation is not performed during signal recording (corresponding to the method (1) above).

Figure 22:
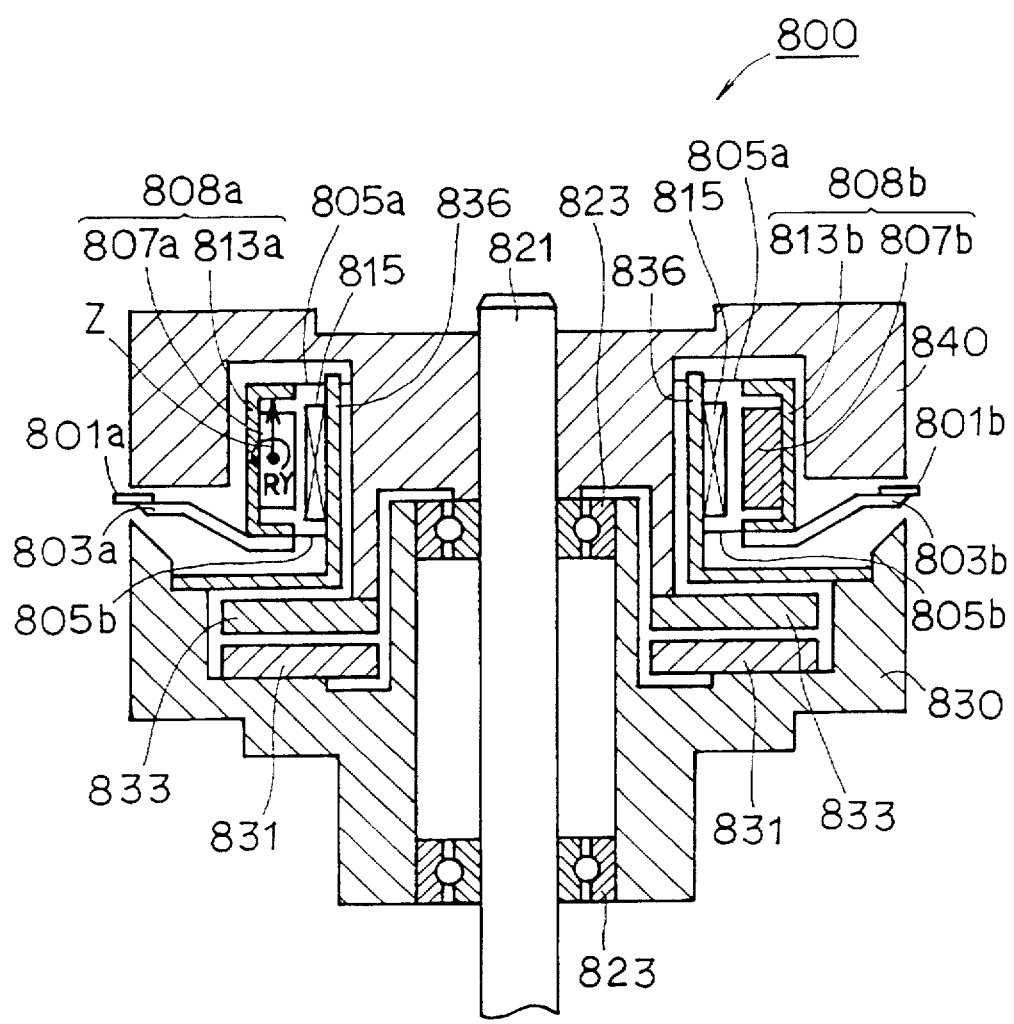
FIG. 22 is a cross section schematically showing a structure of a conventional rotary head type magnetic recording reproducing apparatus.
Figure 23:
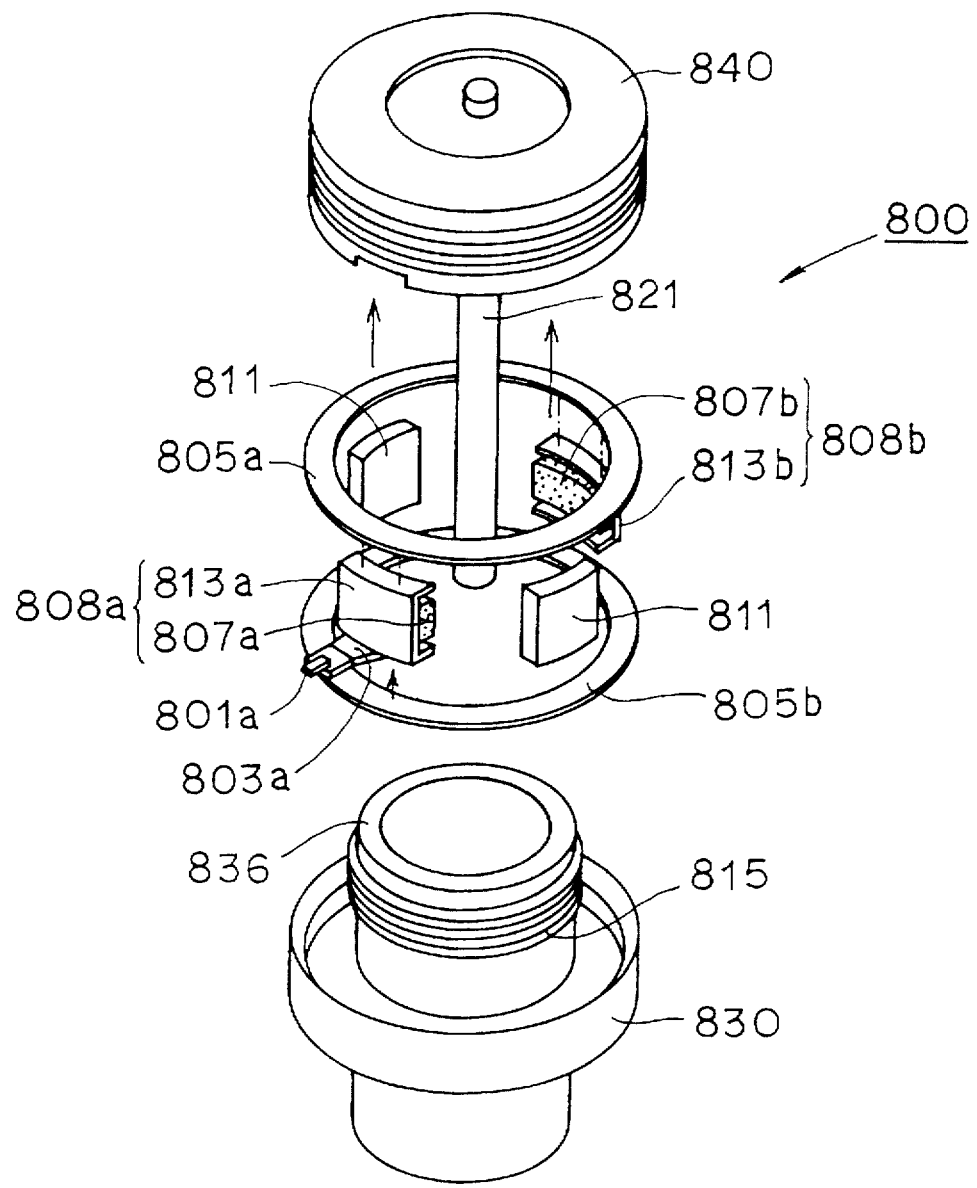
FIG. 23 is an exploded perspective view schematically showing a structure of a conventional rotary head type magnetic recording reproducing apparatus.
Figure 24:
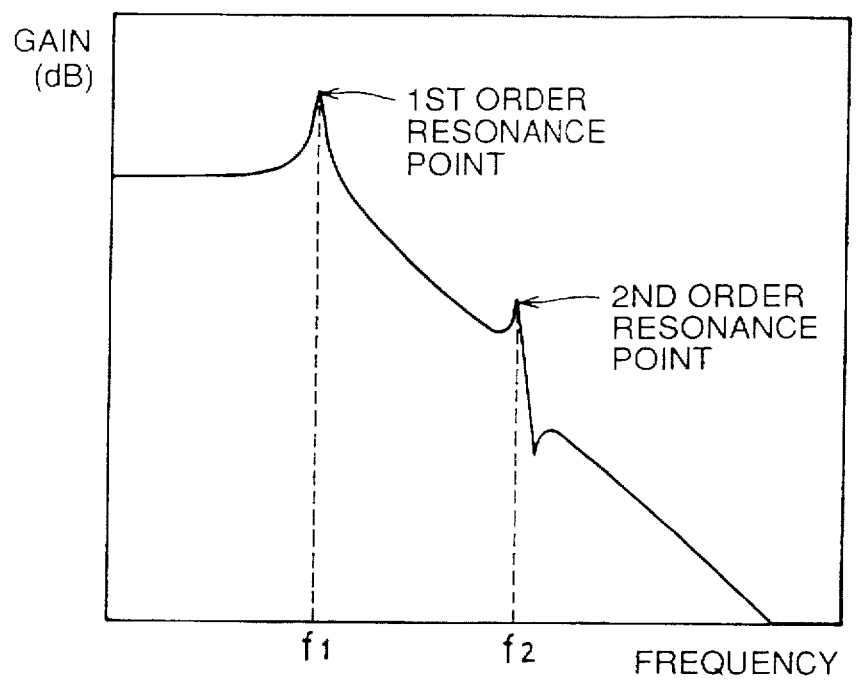
FIG. 24 is a graph showing relation between frequency and gain.
Figure 25:
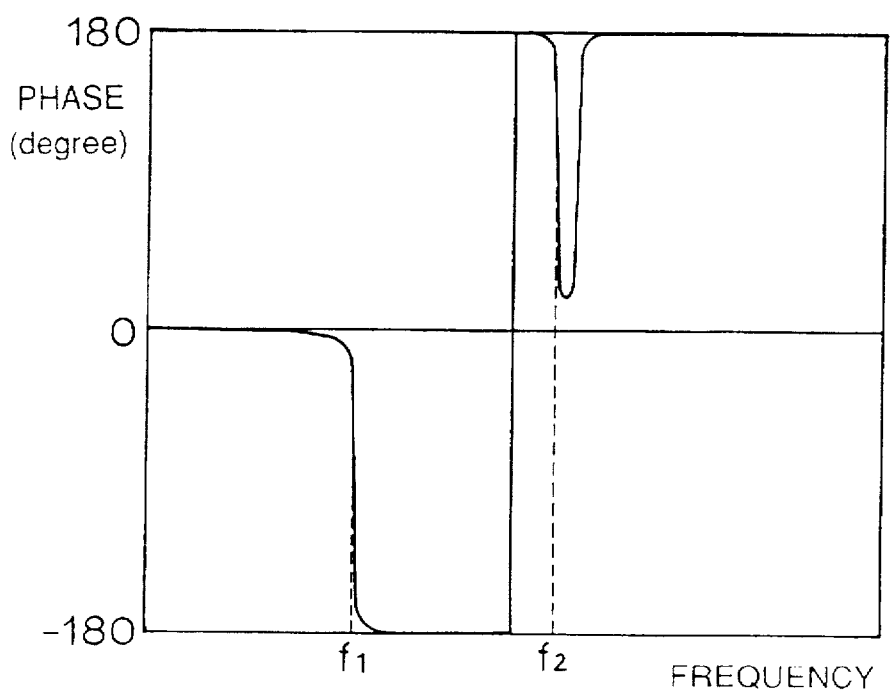
FIG. 25 is a graph showing relation between frequency and phase.
Figure 26:
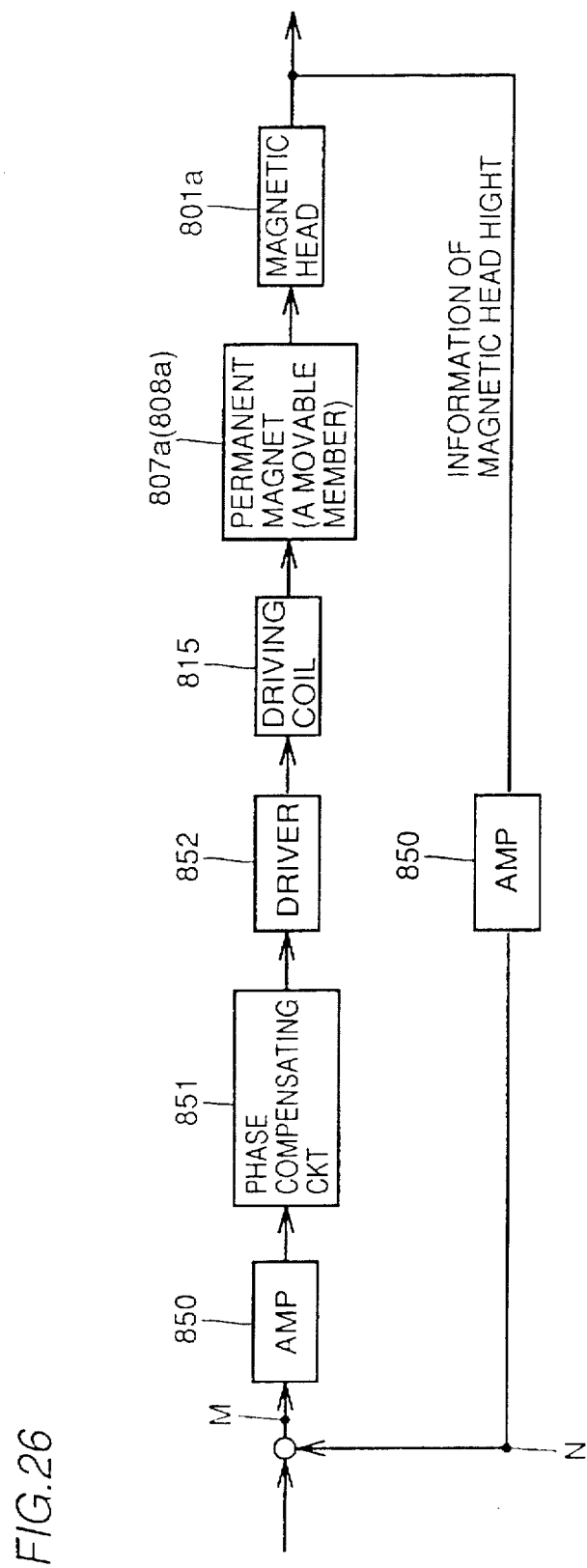
FIG. 26 is a control block diagram in accordance with closed loop control.
Figure 27:
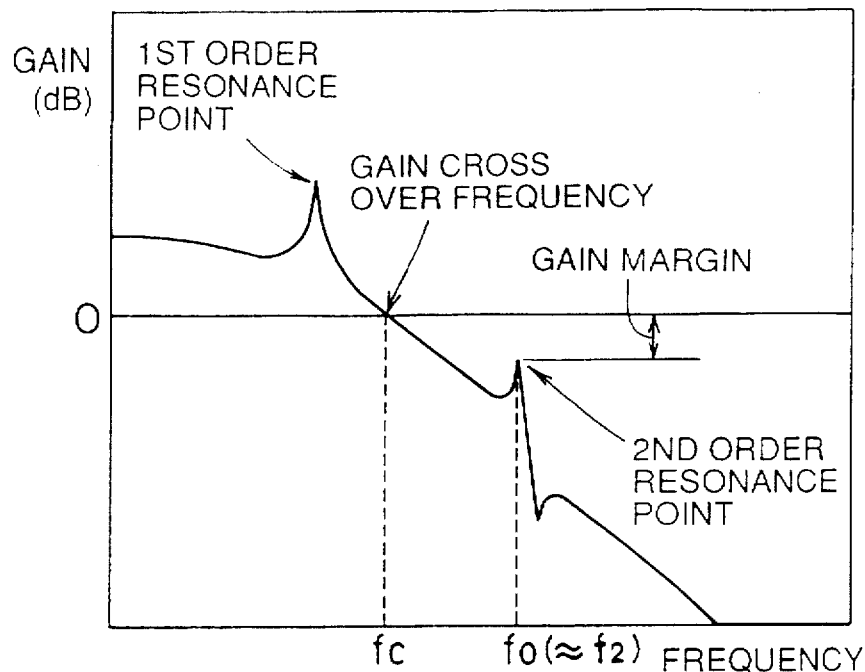
FIG. 27 is a graph showing relation between frequency and gain of an open loop transfer function.
Figure 28:
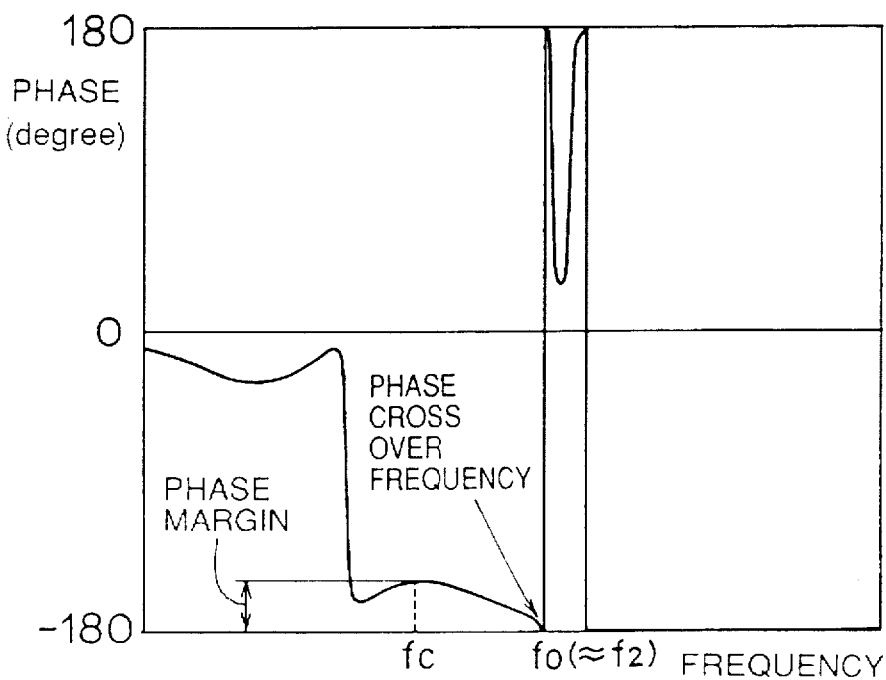
FIG. 28 is a graph showing relation between frequency and phase.
Figure 29:
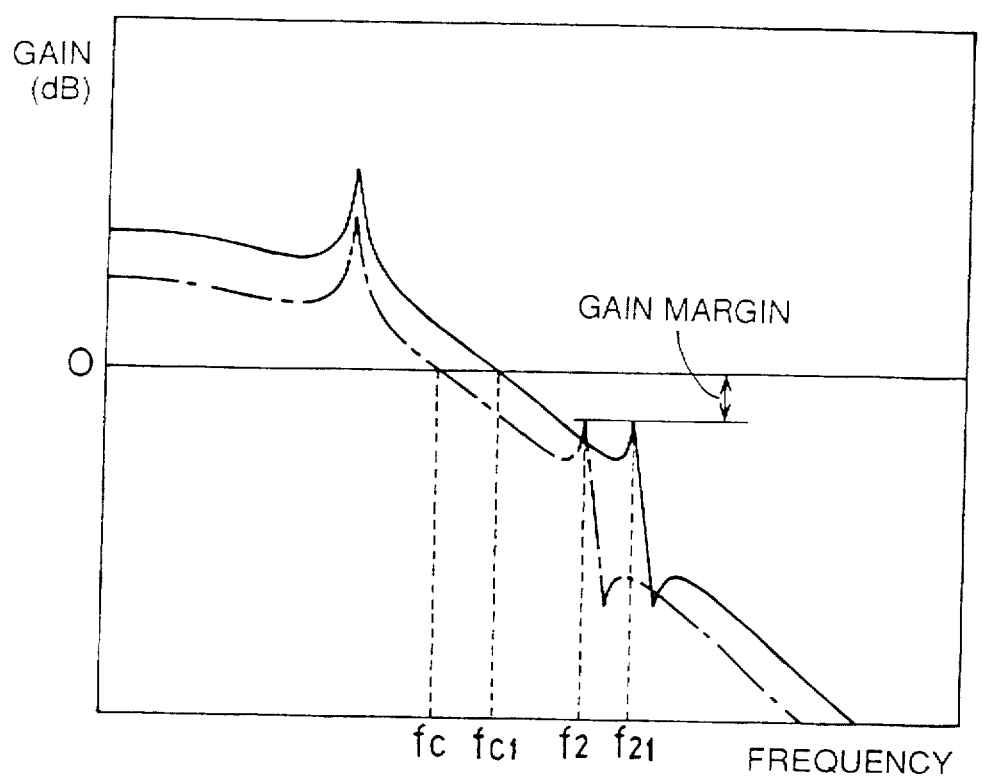
FIG. 29 is a graph showing a phenomenon in which gain crossover frequency increases as second order resonance frequency increases.
Figure 30:
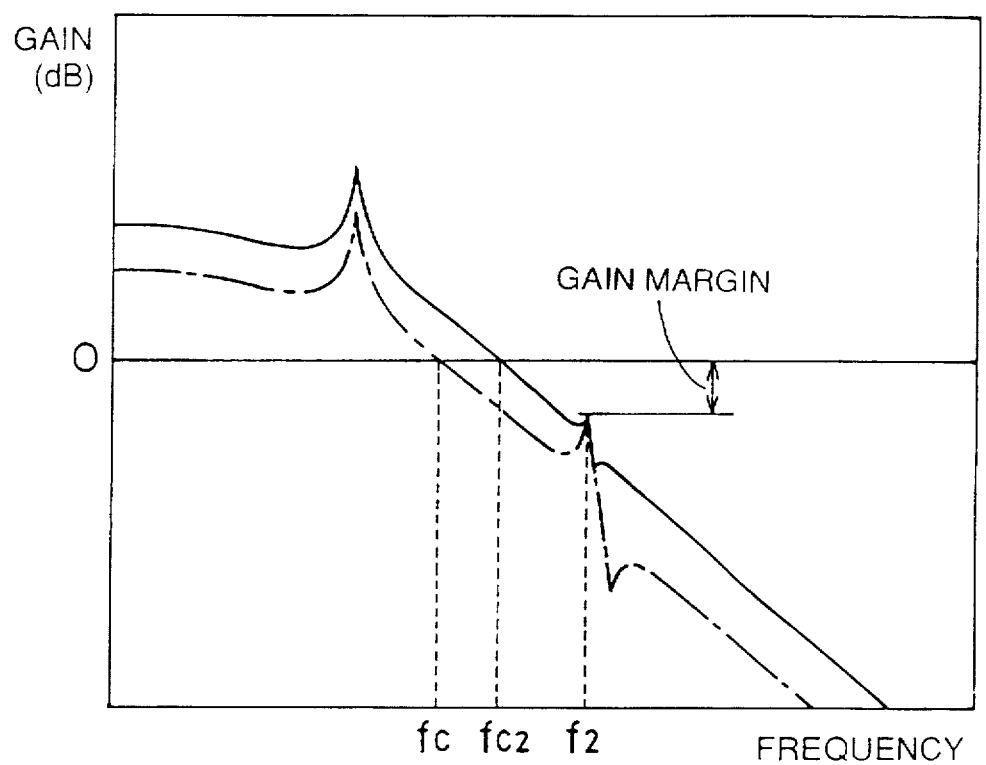
FIG. 30 is a graph showing a phenomenon in which gain crossover frequency increases when a peak value at the second order resonance point is reduced.

From the foregoing, in the rotary head type magnetic recording reproducing apparatus of the present embodiment, first and second coils 15a and 15b are provided opposing to both side surfaces $7a_1$ and $7a_2$ of permanent magnet 7a, as shown in FIG. 5. Therefore, driving force caused by electromagnetic force can act on both side surfaces $7a_1$ and $7a_2$ of permanent magnet 7a. Therefore, larger driving force can be obtained, as compared with the prior art in which driving force acts only on one surface of each of permanent magnets 807a and 807b as shown in FIG. 22. Since the driving force is large, parallel plate springs 5a and 5b can be sufficiently displaced even when stiffness of parallel plate springs 5a and 5b is increased. Therefore, the first order and higher order resonance frequencies can be increased.

Since stiffness of parallel plate springs 5a and 5b can be increased, vibration of magnetic heads 1a and 1b at the time of recording can be suppressed.

Further, yoke 13 constituting the magnetic circuit is arranged on fixed drum 30. Therefore, as compared with the prior art in which parts 813a and 813b of the yoke are included in movable portions 808a and 808b as shown in FIG. 22, mass of the movable portions of parallel plate springs 5a and 5b can be reduced in the present embodiment. Therefore, the first and the higher order resonance frequencies can be increased.

Further, driving force can act on both side surfaces $7a_1$ and $7a_2$ of permanent magnet 7a. Therefore, by setting driving forces $fa_1$ and $fa_2$ equal to each other as shown in FIG. 8, action of the moment in the RY direction on movable member 8a can be prevented as already described. Therefore, peak value of the gain at the resonance point in the RY direction can be reduced.

Figure 9:
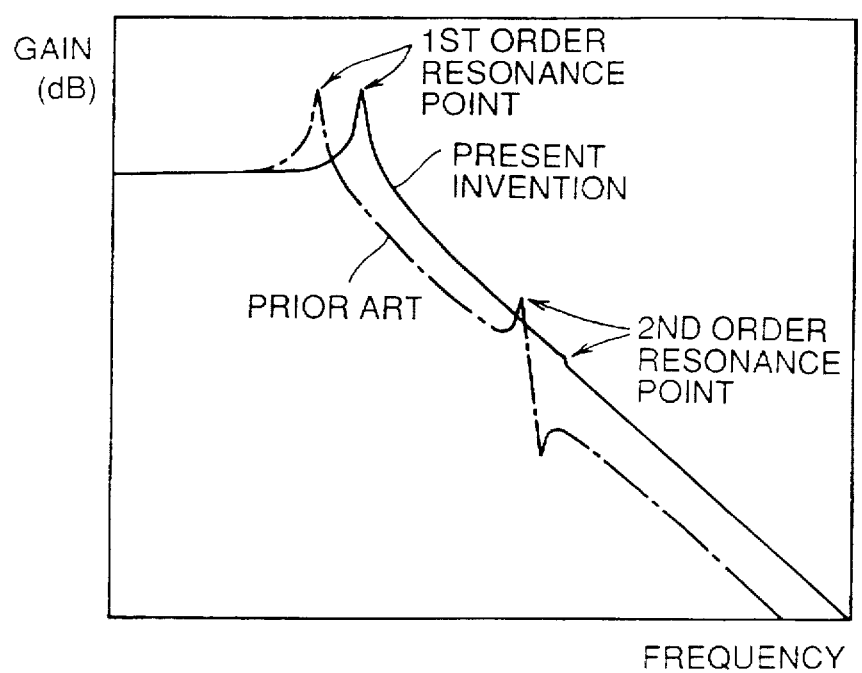
FIG. 9 is a graph showing relation between gain and frequency of the present invention and of the prior art.

FIG. 9 shows relation between frequency and gain in the vibration characteristics of magnetic head 1a, showing frequency response of displacement (output) in the Z direction of FIG. 8 of magnetic head 1a with respect to supplied current (input) to driving coils 15a and 15b. In FIG. 9, the solid line represents a gain-frequency curve of the present embodiment, while one dotted line represents a gain-frequency curve of the prior art.

Referring to FIG. 9, as already described, in accordance with the rotary head type magnetic recording reproducing apparatus of the present embodiment, second order resonance frequency can be increased than in the prior art, and the peak value of the gain at the second order resonance point can be reduced. Therefore, in the present embodiment, gain crossover frequency of open loop transfer function in closed loop control can be set higher, and hence response frequency of dynamic tracking can be increased. Therefore, even when the number of rotation of the drum is further increased, the magnetic head can follow the track curve at the time of signal reproduction, thus improving responsiveness of dynamic tracking operation.

Second Embodiment

Figure 10:
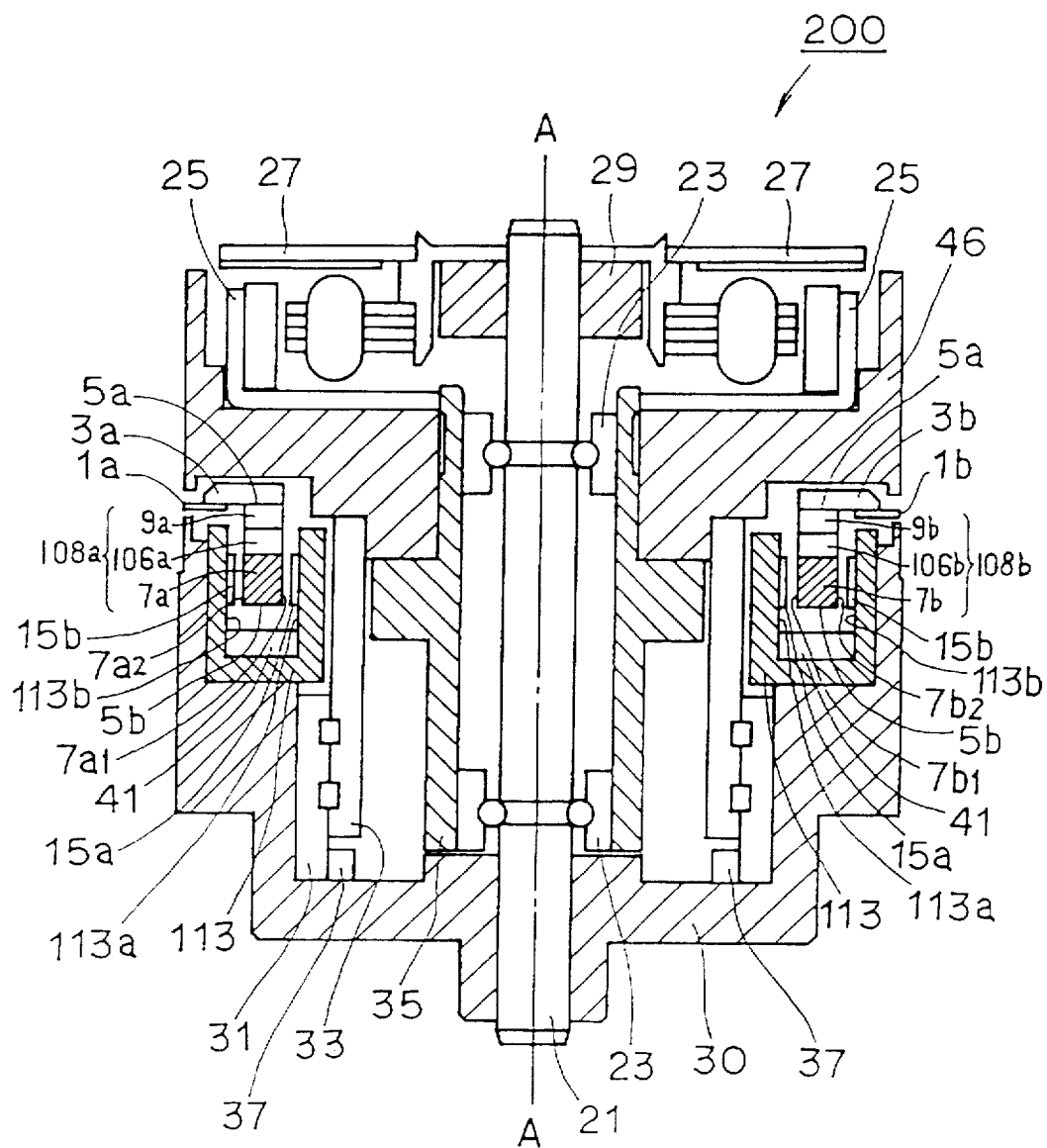
FIG. 10 is a schematic cross section corresponding to FIG. 5 of the rotary head type magnetic recording reproducing apparatus in accordance with a second embodiment of the present invention.

Referring to FIG. 10, a rotary head type magnetic recording reproducing apparatus 200 of the present embodiment differs from the first embodiment in the structures of movable member 108a and yoke 113. More specifically, movable member 108a has a three layered structure including permanent magnet 7a, a shield plate 106a formed of a soft magnetic material, and a spacer 9a formed of a nonmagnetic material. Movable member 108b has similar structure. Side surfaces 113a and 113b of the concave portion of yoke 113 extend to a height corresponding to shield plates 106a and 106b.

As in the above described embodiment, spacers 9a and 9b are not always necessary, as they are provided simply to provide spaces. Except these points, the present embodiment is approximately the same as the first embodiment, and therefore, corresponding components are denoted by the same reference characters and description thereof is not repeated.

In the present embodiment, shield plates 106a and 106b absorb leakage flux of magnetic circuit including permanent magnets 7a, 7b and a yoke 113. Specifically, shield plate 106a absorbs magnetic flux directly entering magnetic pole $7a_2$ from magnetic pole $7a_1$ of permanent magnet 7a. Therefore, the leakage flux mentioned above does not reach magnetic head 1a, and therefore superior recording and reproducing characteristics can be maintained.

Function of shield plate 106b is the same as described above.

Third Embodiment

Figure 11:
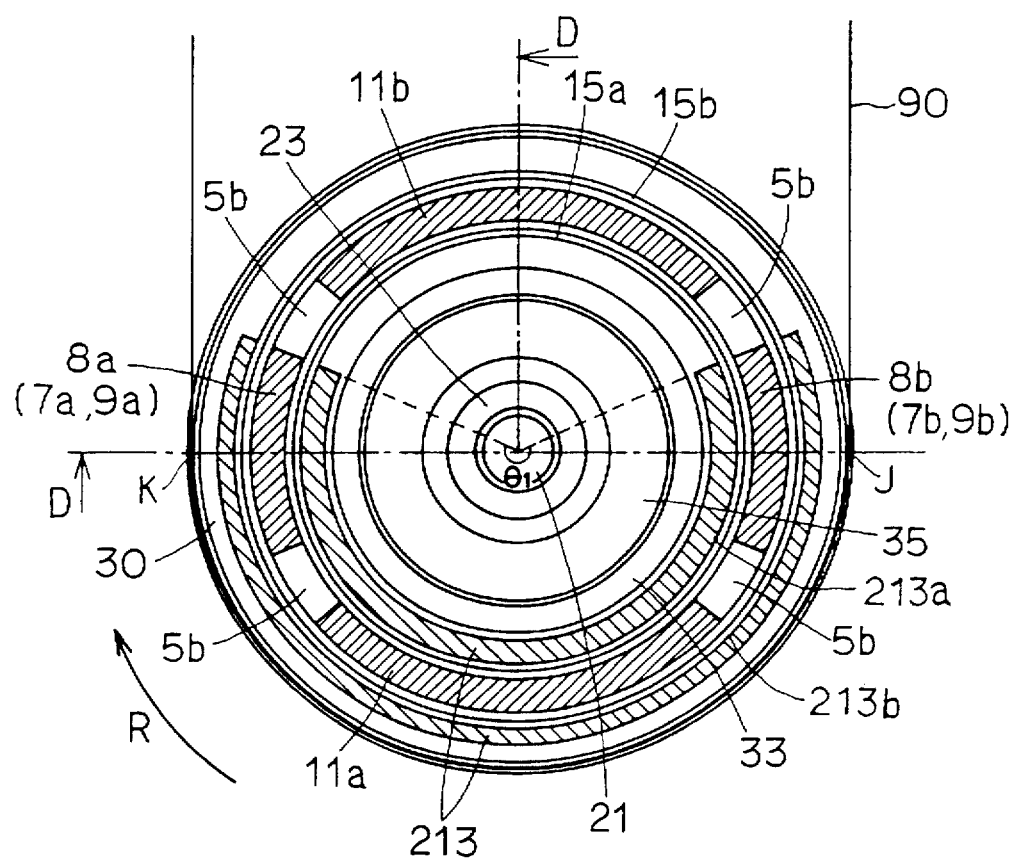
FIG. 11 is a schematic plan view corresponding to FIG. 4 of a rotary head type magnetic recording reproducing apparatus in accordance with a third embodiment of the present invention.
Figure 12:
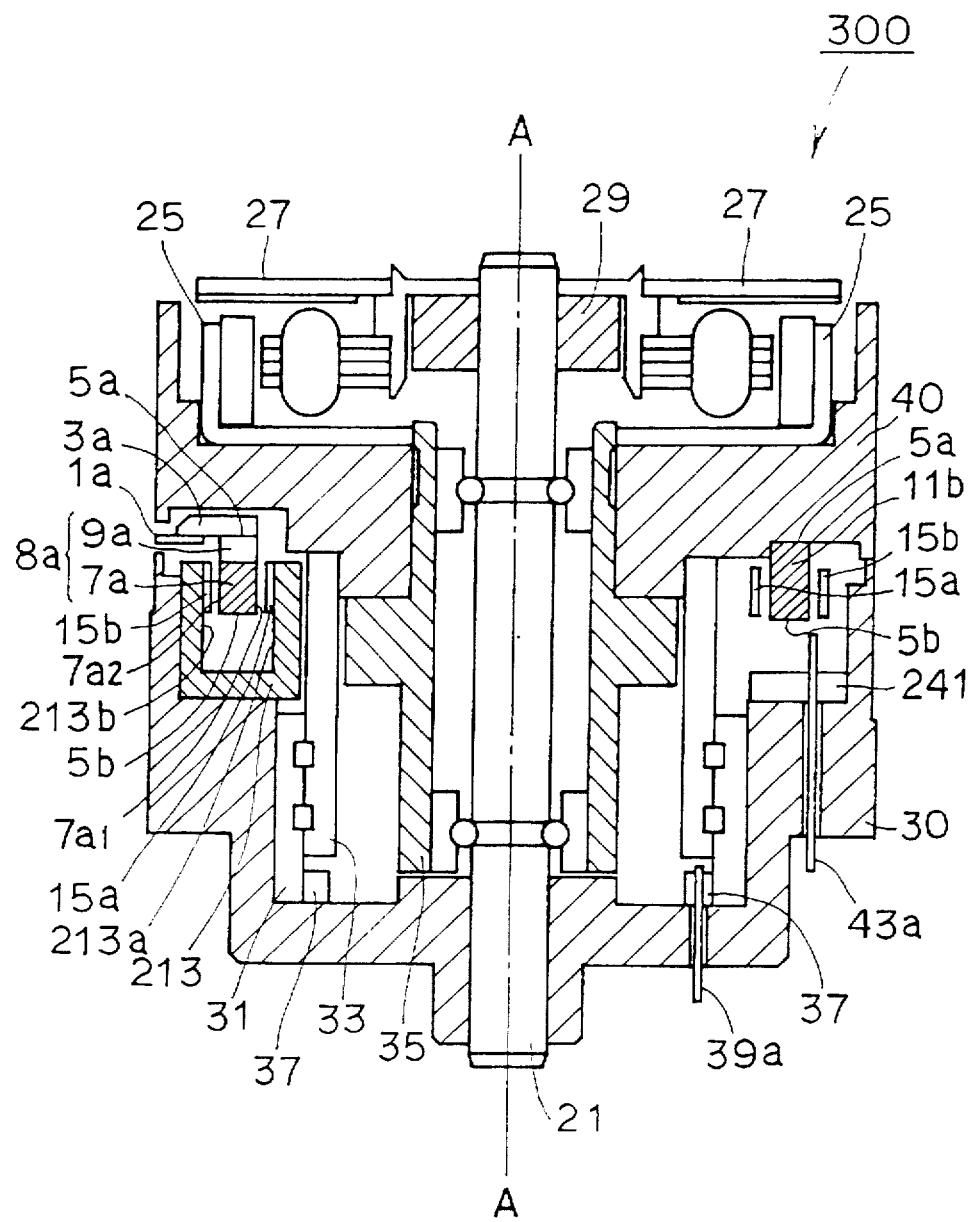
FIG. 12 is a schematic cross section along the line D—D of FIG. 11 of the rotary head type magnetic recording reproducing apparatus in accordance with the third embodiment of the present invention.

Referring to FIGS. 11 and 12, the rotary head type magnetic recording reproducing apparatus 300 of the present embodiment differs from the first embodiment in the structure of a yoke 213. More specifically, while yoke 13 is formed as an annulus over the entire periphery in the first embodiment, yoke 213 of the present embodiment has an arcuate shape.

Except this point, the present embodiment is almost the same as the structure of the first embodiment. Therefore, corresponding components are denoted by the same reference characters and description thereof is not repeated.

Referring to FIGS. 11 and 12, two magnetic heads 1a and 1b (magnetic head 1b is not shown) attached on the first plate spring 5a are arranged at central portions of movable portions 8a and 8b. More specifically, two magnetic heads 1a and 1b are arranged at positions different from each other by 180°, with the shaft 21 being the center. The winding angle of magnetic tape 90 around drum 300 is set to be 180°. Here, points J and K denote end points of winding of magnetic tape 90 around fixed drum 30.

When magnetic heads 1a and 1b rotate in the R direction together with rotary drum 40, the head is brought into contact with magnetic tape 90 at point J, and it is removed from magnetic tape 90 at point K. Simultaneously with the removal of magnetic head 1a from magnetic tape 90, magnetic head 1b is brought into contact with magnetic tape 90. More specifically, both side surfaces 213a and 213b of yoke 213 are arranged such that they are at least opposed to magnetic poles $7a_1$ and $7a_2$ of permanent magnet 7a while magnetic head 1a scans magnetic tape 90 from the point J to the point K. Therefore, while magnetic head 1a scans magnetic tape 90, dynamic tracking operation similar to the first and second embodiments is possible. The same applies to magnetic head 1b.

Figure 13:
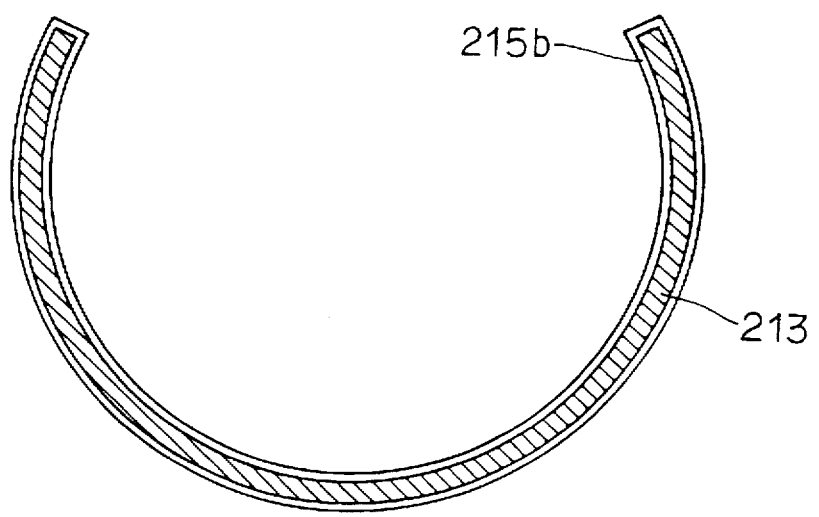
FIG. 13 is a schematic plan view showing a structure when a coil is arranged to surround a sidewall of a yoke.
Figure 14:
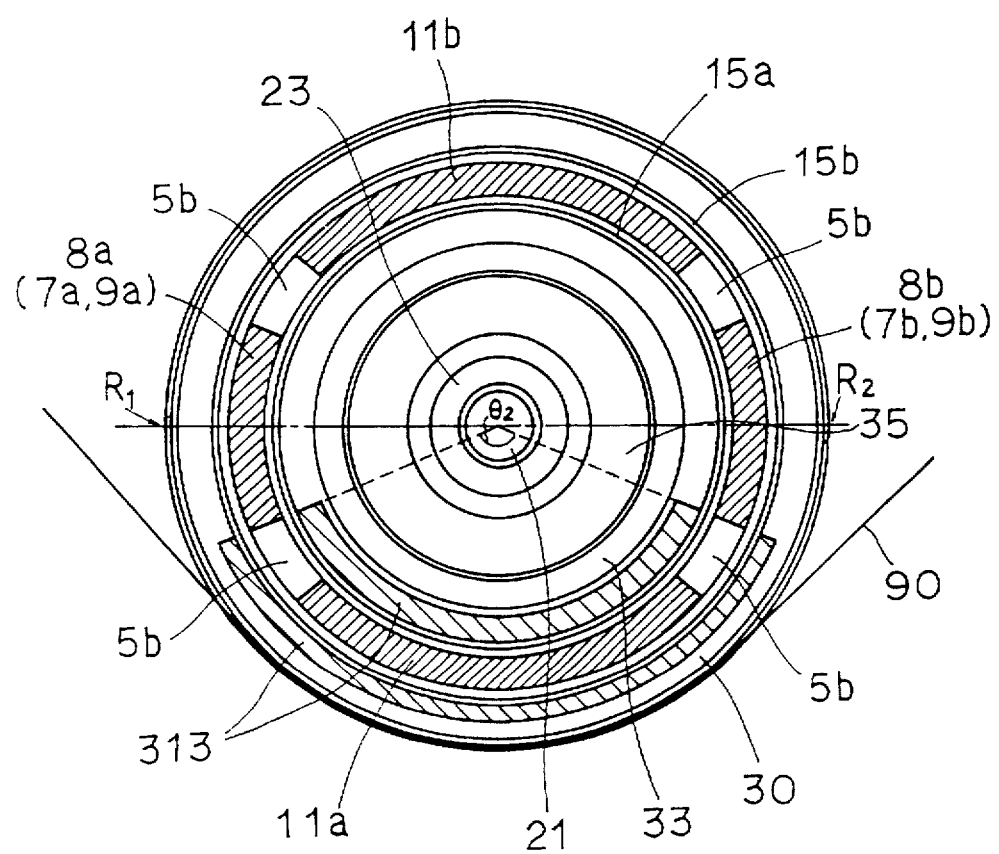
FIG. 14 is a schematic plan view corresponding to FIG. 4 of a rotary head type magnetic recording reproducing apparatus in accordance with a fourth embodiment of the present invention.

Though the first and the second driving coils 15a and 15b are annular, coils may be wound around a wall surface of yoke 213 as shown in FIG. 13.

In the present embodiment, yoke 213 have wall surfaces 213a and 213b of arcuate shape having the same central angle $\theta_1$. However, wall surfaces are not limited to such shape. For example, one wall surface may have an arcuate shape while the other wall surface may have an annular shape.

The wall surfaces 213a and 213b of yoke 213 may not be one arc each, but they may have such a shape that includes a plurality of arcs.

From the foregoing, in the rotary head type magnetic recording reproducing apparatus of the present embodiment, yoke 213 has an arcuate shape, different from the yoke 13 of the first embodiment which has an annular shape and provided over the entire periphery. Therefore, as compared with the first embodiment, a space is obtained which corresponds to the omission of the yoke, in fixed drum 30. A sensor for detecting the height of the magnetic head or terminals of various wirings may be arranged with margin in this space. By utilizing this space, various other and higher functions may be realized while maintaining the size of the apparatus.

Fourth Embodiment

The present embodiment differs from the structure of the third embodiment in the structure of yoke 313. Except this point, the present embodiment is almost the same as the third embodiment. Therefore, the same components are denoted by the same reference characters and description thereof is not repeated.

Two magnetic heads 1a, 1b not shown here are arranged about shaft 21 at positions different from each other by 180° as in the third embodiment. The winding angle of magnetic tape 90 on the drum is 90°.

In this embodiment also, while magnetic head 1a or 1b is scanning magnetic tape 90, the permanent magnet of the movable portion which corresponds to the magnetic head scanning magnetic tape 90 opposes to the wall surface of the yoke. Therefore, as in the third embodiment, while magnetic head 1a or 1b scan magnetic tape 90, dynamic tracking operation is possible.

When mutually opposing two magnetic heads 1a and 1b are at rotational positions of points R1 and R2, permanent magnets 7a and 7b supported by parallel plate springs 5a and 5b do not oppose to the wall surface of yoke 313. Therefore, when the rotary head type magnetic recording reproducing apparatus is assembled at this position, attraction of permanent magnets 7a and 7b to the wall surface of yoke 313 during assembly can be perfectly prevented, thus assembly is facilitated.

Fifth Embodiment

Figure 15:
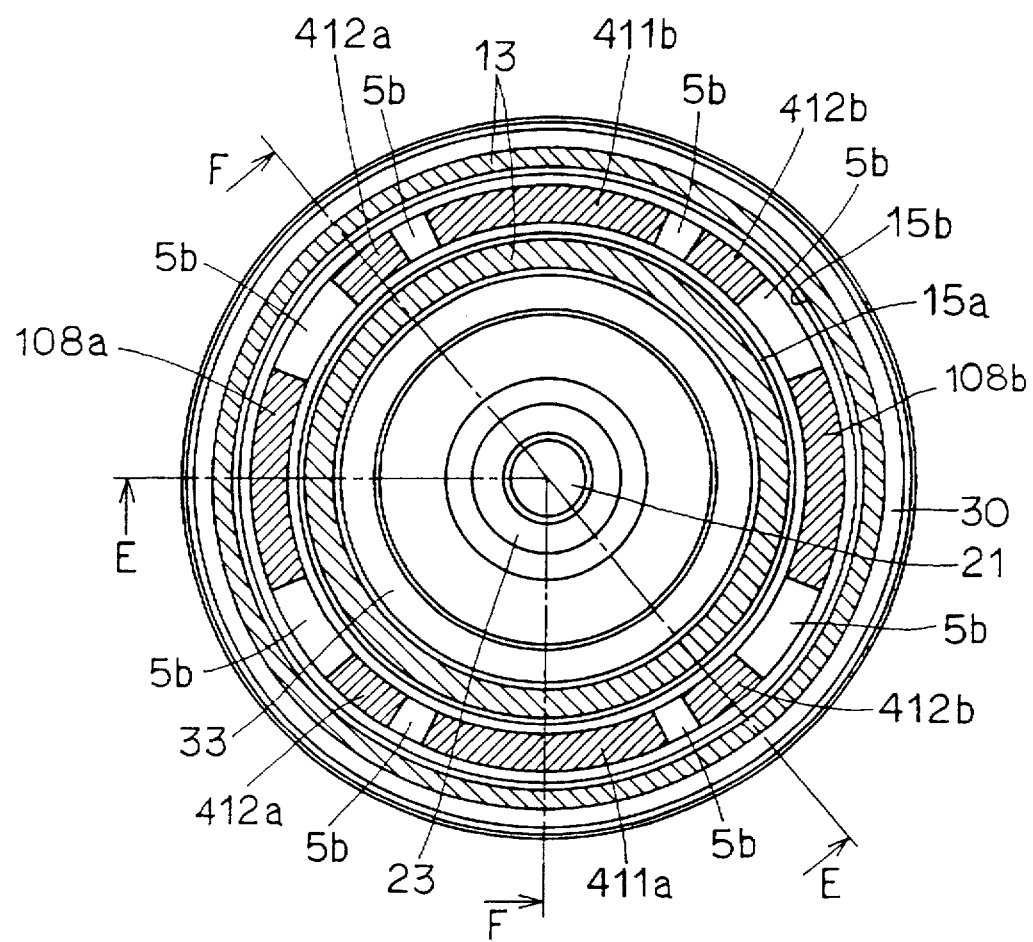
FIG. 15 is a schematic plan view corresponding to FIG. 4 of a rotary head type magnetic recording reproducing apparatus in accordance with a fifth embodiment of the present invention.
Figure 18:
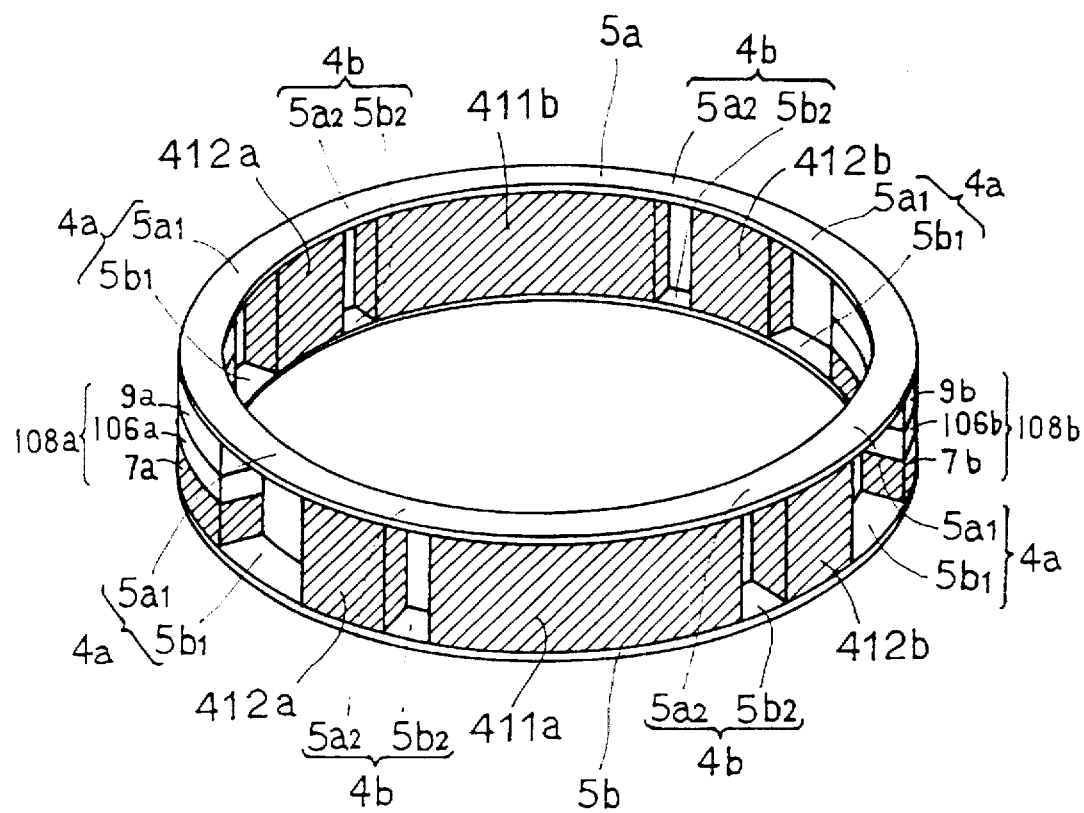
FIG. 18 is a perspective view schematically showing a structure of parallel plate springs and a member gripped therebetween mounted on the rotary head type magnetic recording reproducing apparatus in accordance with the fifth embodiment of the present invention.

Referring to FIGS. 15 and 18, the rotary head type magnetic recording reproducing apparatus 500 of the present embodiment differs from the second embodiment in the structures of the member gripped between parallel plate springs and adjustment screw 447.

More specifically, parallel plate springs 5a and 5b grip fixed members 411a and 411b, movable members 108a and 108b, as well as four head height adjusting members 412a, 412a, 412b, 412b. Head height adjusting members 412a, 412a are positioned between fixed member 411b and movable member 108a, and between fixed member 411a and movable member 108a, respectively. Head height adjusting members 412b, 412b are positioned between fixed member 411b and movable member 108b, and between fixed member 411a and movable member 108b.

Figure 16:
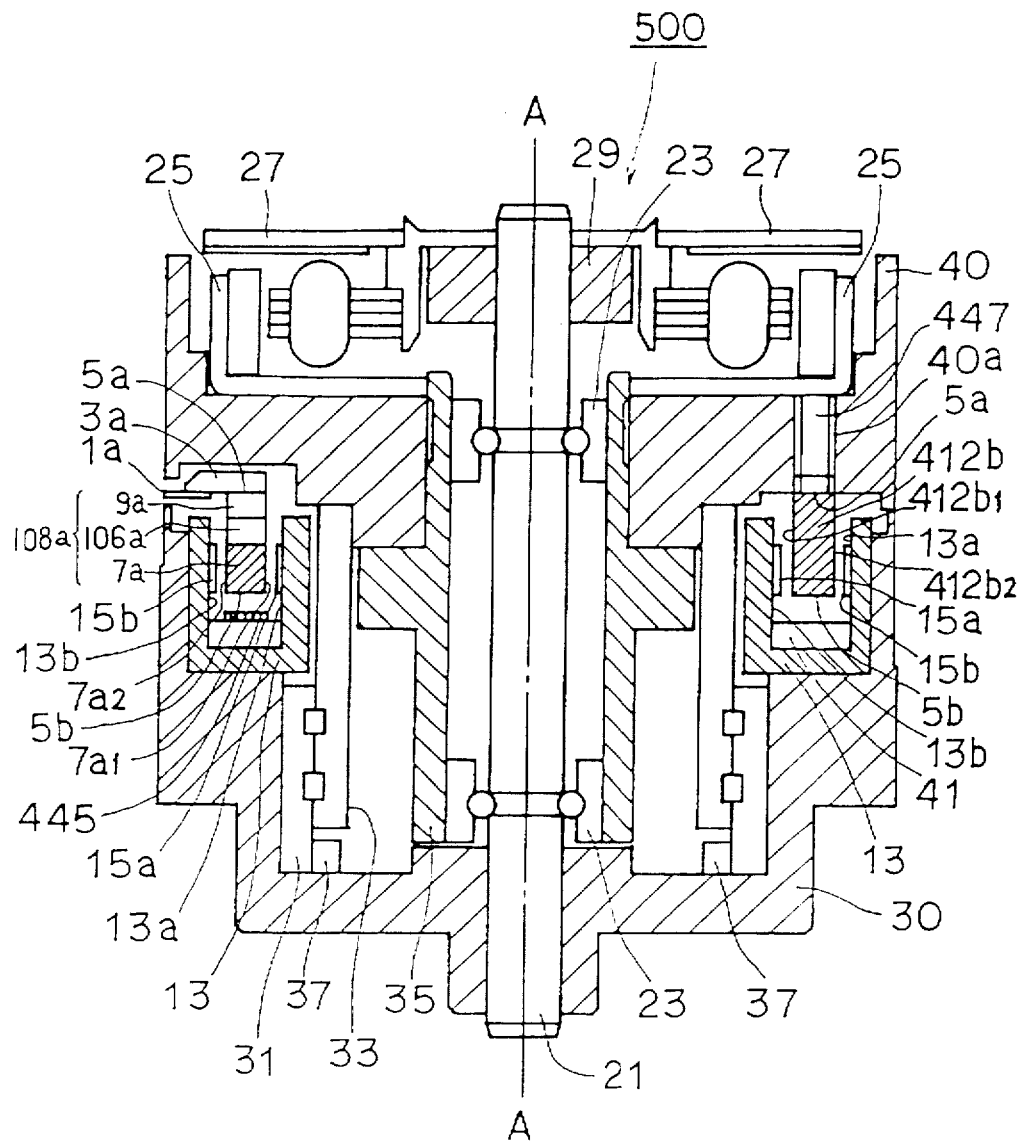
FIG. 16 is a schematic cross section corresponding to the cross section along the line E—E of FIG. 15 of the rotary head type magnetic recording reproducing apparatus in accordance with the fifth embodiment of the present invention.
Figure 17:
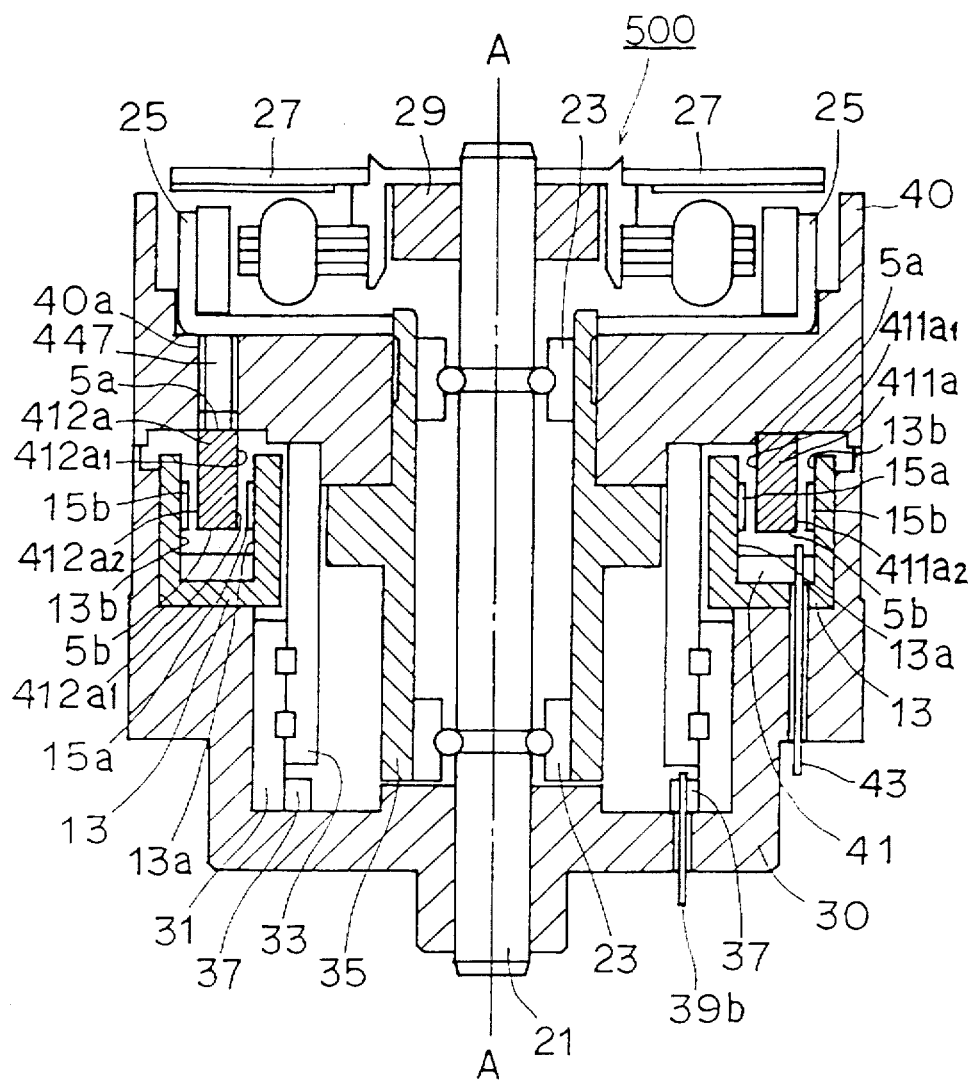
FIG. 17 is a schematic cross section corresponding to a cross section along the line F—F of FIG. 15 of the rotary head type magnetic recording reproducing apparatus in accordance with the fifth embodiment of the present invention.

Then, referring to FIGS. 16 and 17, the parallel plate springs 5a, 5b gripping the head height adjusting members and so on are attached on rotary drum 40 at positions where fixed members 411a and 411b are mounted. At this state, four adjustment screws 447 are screwed in screw holes 40a of rotary drum 40, so that each position of plate spring 5a where the head height adjusting member is attached can be pressed from above in the figure.

Here, portions of plate springs 5a and 5b between the movable member and the head height adjusting member are denoted by $5a_1$ and $5b_1$, while portions between head height adjusting member and the fixed member are denoted by $5a_2$ and $5b_2$. The parallel plate springs constituted by the aforementioned plate springs 5a, and 5b, will be denoted by 4a, and the parallel plate springs constituted by plate springs $5a_2$ and $5b_2$ will be denoted by 4b.

In the above described structure, movable member 108a serves as a movable portion of two sets of parallel plate springs 4b, 4a which are linked through head height adjusting members 412a, 412a, with fixed members 411a, 411b serving as fixed ends. The same applies to movable member 108b.

Here, the peripheral length of parallel plate spring 4b is made shorter than the peripheral length of parallel plate spring 4a, so that stiffness of parallel plate spring 4b is made sufficiently higher than that of parallel plate spring 4a. The stiffness of parallel plate spring 4b may be increased by making wider the radial width of parallel plate spring 4b than the width of parallel plate spring 4a. Four head height adjusting members 412a, 412a, 412b, 412b are formed of light material and the shape thereof is devised so that mass of these members is as small as possible.

A method of adjusting absolute height of the magnetic head during assembly of the rotary head type magnetic recording reproducing apparatus of the present embodiment will be described. Here, only the method of adjusting magnetic head 1a will be described. However, the same applies to magnetic head 1b.

Referring to FIGS. 16 and 17, in the process of assembly of the apparatus described in the first embodiment, rotary drum 40 is fixed on disc 35, and then head height adjusting members 412a, 412a are pressed downward by head height adjusting screws 447 with plate spring 5a interposed, while the height of magnetic head 1a is observed. At this time, current is not supplied to driving coils 15a, 15b. Therefore, movable member 108a moves downward in the figure, together with the head height adjusting members 412a, 412a, thus enabling adjustment of absolute height of magnetic head 1a.

After the height of magnetic heads 1a, 1b is adjusted, assembly is completed in the similar manner as the first embodiment. The absolute height of magnetic heads 1a, 1b before height adjustment is set to be little higher than the standard height.

Basic operation of the actuator for tracking of the present embodiment will be described. Here, only the operation of magnetic head 1a will be described. However, the same applies to magnetic head 1b.

When driving force ($fa_1$, $fa_2$) which have been described with reference to FIG. 8 of the first embodiment, acts on permanent magnet 7a, movable member 108a and magnetic head 1a are displaced in the upward and downward directions of FIG. 16, with the standard height thereof being the center.

When the driving force acts upward in the FIG. 16, movable member 108a is displaced upward in the FIG. 16 to a position where the reaction of parallel plate spring 4a having head height adjusting members 412a, 412a abutting adjustment screw 447 as fixed ends as shown in FIGS. 16 and 18, is balanced with said driving force.

When the driving force acts downward, movable member 108a is displaced downward in the figure, to a position where the reaction of parallel plate springs 4b and 4a which are linked with head height adjusting members 412a, 412a interposed and having fixed members 411a, 411b as fixed ends is balanced with said driving force. Here, since the stiffness of parallel plate spring 4b is sufficiently higher than that of parallel plate spring 4a, head height adjusting members 412a, 412a are hardly displaced and they do not cause any unwanted vibration.

Specific operation of the actuator for tracking in recording or reproducing signals of the present embodiment is almost the same as that of the first embodiment. Therefore, description is not repeated.

As described above, in the present embodiment, dynamic tracking operation with the standard height of magnetic heads 1a, 1b being the center is possible during signal reproduction.

At the time of signal recording, dynamic tracking operation with the standard height of magnetic heads 1a, 1b being the center, or signal recording at the standard height, is possible.

Further, adjustment of the absolute height of magnetic heads 1a, 1b has been already made during assembly of the apparatus. Therefore, it is not necessary to adjust absolute height of magnet heads 1a, 1b by supplying a DC bias current to the driving coil at the time of recording or reproducing the signals.

Sixth Embodiment

In the fifth embodiment above, absolute height of magnetic heads 1a, 1b is set to the standard height at the time of assembly of the apparatus.

The present embodiment further allows adjustment of difference in relative height between two magnetic heads 1a, 1b caused by aging, for example.

Figure 19:
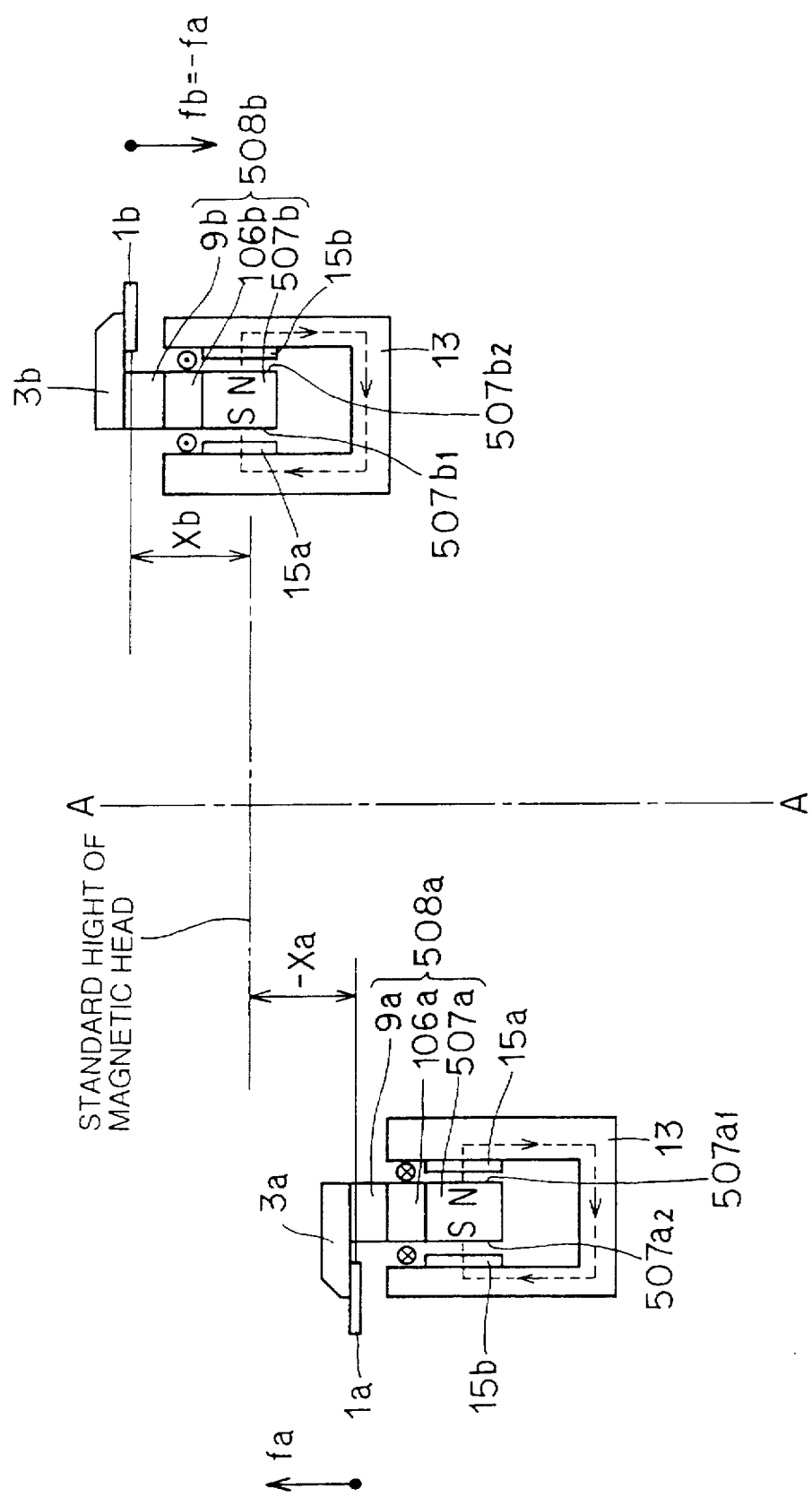
FIG. 19 is a schematic partial cross section showing generation of difference in relative heights of magnetic heads in a rotary head type magnetic recording reproducing apparatus in accordance with a sixth embodiment of the present invention.

Referring to FIG. 19, the structure of the rotary head type magnetic recording reproducing apparatus of the present embodiment differs from that of the fifth embodiment in the direction of magnetization of two permanent magnets. For example, one permanent magnet 507a is magnetized such that one side surface 507a, near the axis A—A of the shaft serves as the N pole, while the other side surface $507a_2$ serves as the S pole. Permanent magnet 507b is magnetized such that one side surface 507b, nearer to the axis A—A of the shaft serves as the S pole, while the other side surface $507b_2$ serves as the N pole.

Except this point, the structure is almost the same as that of the fifth embodiment. Therefore, the same components are denoted by the same reference characters, and description thereof is not repeated.

Basic operation of the actuator for tracking of the present embodiment will be described.

As already described, in the present embodiment, direction of magnetization of two permanent magnets 507a and 507b are opposite to each other as shown in FIG. 19. Therefore, when currents of the same direction and the same magnitude are applied to driving coils 15a and 15b, driving forces fa and fb having the same magnitude but opposite directions act on permanent magnets 507a and 507b. Therefore, magnetic heads 1a and 1b are displaced in the directions opposite to each other.

Figure 20:
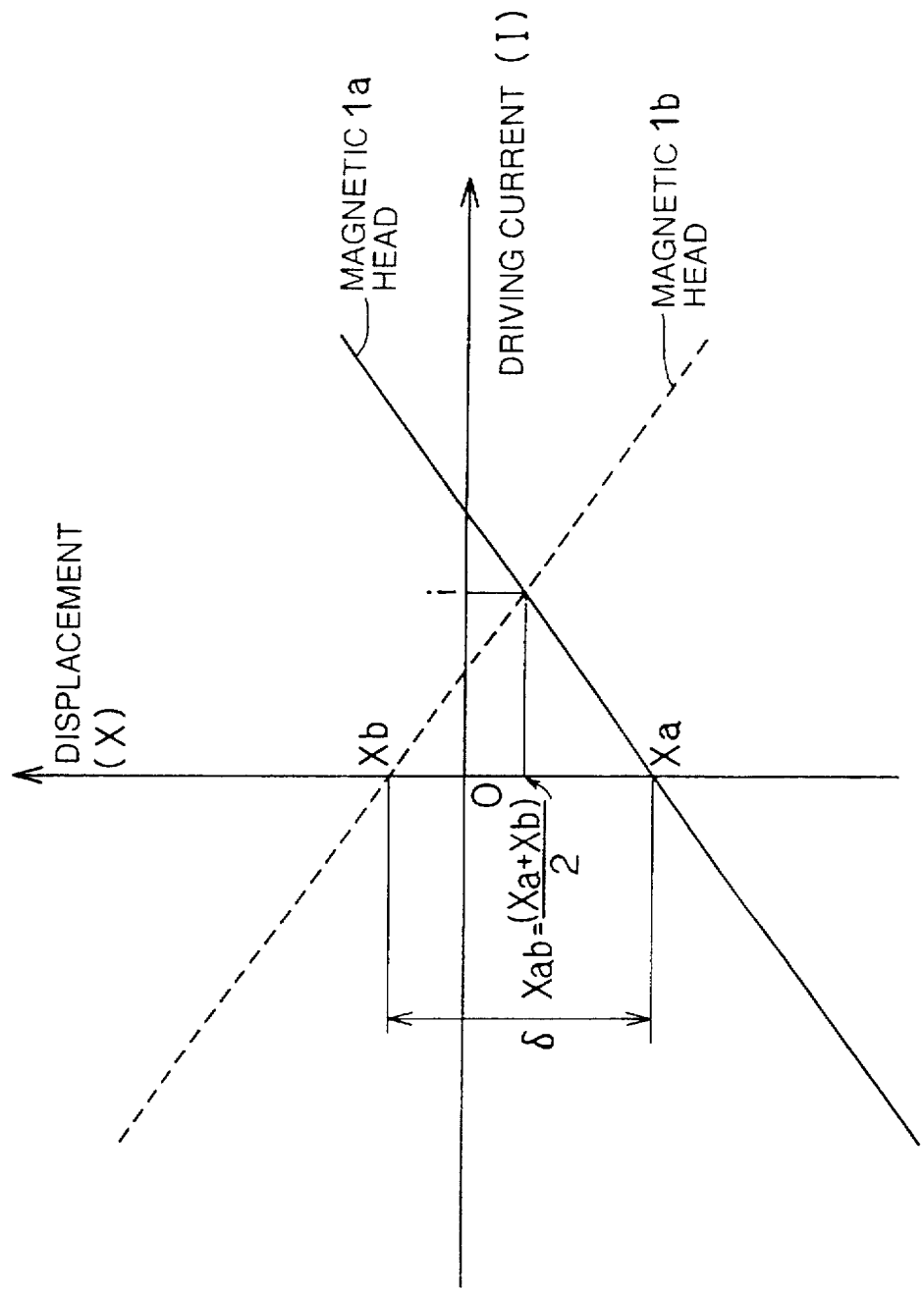
FIG. 20 is a graph showing relation between a driving current and displacement of the magnetic head.

Referring to FIG. 20, the abscissa represents driving current, showing currents supplied to the two driving coils where the direction shown in FIG. 19 is positive and the opposite direction is negative. The ordinate represents displacement of magnetic heads 1a and 1b, where the standard height of the magnetic head corresponds to the origin, upward direction of FIG. 19 is positive and downward direction in the figure is negative. FIG. 20 shows an example in which absolute heights of magnetic heads 1a, 1b when current is not supplied to the driving coil are deviated from the standard height.

The absolute heights of magnetic heads 1a, 1b have been adjusted to the standard height during the assembly of the apparatus as already described in the fifth embodiment, and the absolute heights are deviated because of aging, for example. Such deviation or difference of the height of the magnetic head because of aging is caused by degradation of the contact state between head height adjusting member and head height adjusting screw, distortion of repeated operation of parallel plate springs, and so on.

Referring to FIG. 20, absolute heights of magnetic heads 1a and 1b are deviated from the reference point by Xa and Xb, respectively. Therefore, there is caused difference δ in relative heights of magnetic heads 1a, 1b, that is, δ=|Xa−Xb|. When a DC bias current of I=i is supplied, magnetic heads 1a and 1b are displaced to the absolute height of Xab=(Xa+Xb)/2, and thus relative heights are adjusted.

Since Xa and Xb are in the order of several μm at most, the deviation in absolute height Xab of magnetic heads 1a and 1b is within the tolerable range of the tape format.

The aforementioned DC bias current have only to absorb difference in relative height caused by aging, for example, of the magnetic heads 1a and 1b. It is not necessary to absorb all the differences caused by variation in attachment of magnetic heads.

Detection of the difference in relative height of magnetic heads 1a, 1b is performed indirectly by detecting absolute heights of magnetic heads 1a and 1b, for example. Detection of absolute heights of magnetic heads 1a and 1b may be performed once per one rotation of magnetic heads 1a and 1b, for example, and at least one sensor may be provided. The sensor may be arranged at any portion. For example, it may be provided at the side of fixed drum, on the side of rotary drum, external to the drum apparatus and so on. Capacitance type, eddy current type, optical type or other type of detecting method may be used.

FIG. 16 shows an example in which a capacitance type sensor 445 as an example of the sensor is arranged on the side of fixed drum 30. The capacitance sensor 445 is opposed to plate spring 5b, and detects capacitance therebetween. By detecting capacitance of plate spring 5b at the portion where magnetic heads 1a and 1b are positioned, heights of magnetic heads 1a and 1b can be detected.

The plate spring 5b is formed of an electric conductive material such as phosphor bronze.

As described above, by the rotary head type magnetic recording reproducing apparatus of the present invention, difference in relative heights of the two sets of magnetic heads can also be adjusted.

Further, the amount of adjustment of the relative height of the magnetic head is only the amount caused by aging, for example. Therefore, the amount of DC bias current supplied to the driving coil, and the amount of displacement to be ensured by the actuator can be smaller than the example shown in Japanese patent publication No. 61-52532. This is because the absolute height and the relative height of the magnetic head at the initial state has already been adjusted during the assembly of the apparatus as already described in the fifth embodiment.

Seventh Embodiment

In the first to sixth embodiment, the first and the second plate springs 5a and 5b constituting the parallel plate springs have the same ring shape. By contrast, in the present invention, the first plate spring 605a and second plate spring 605b constituting the parallel plate springs have different shapes.

Figure 21:
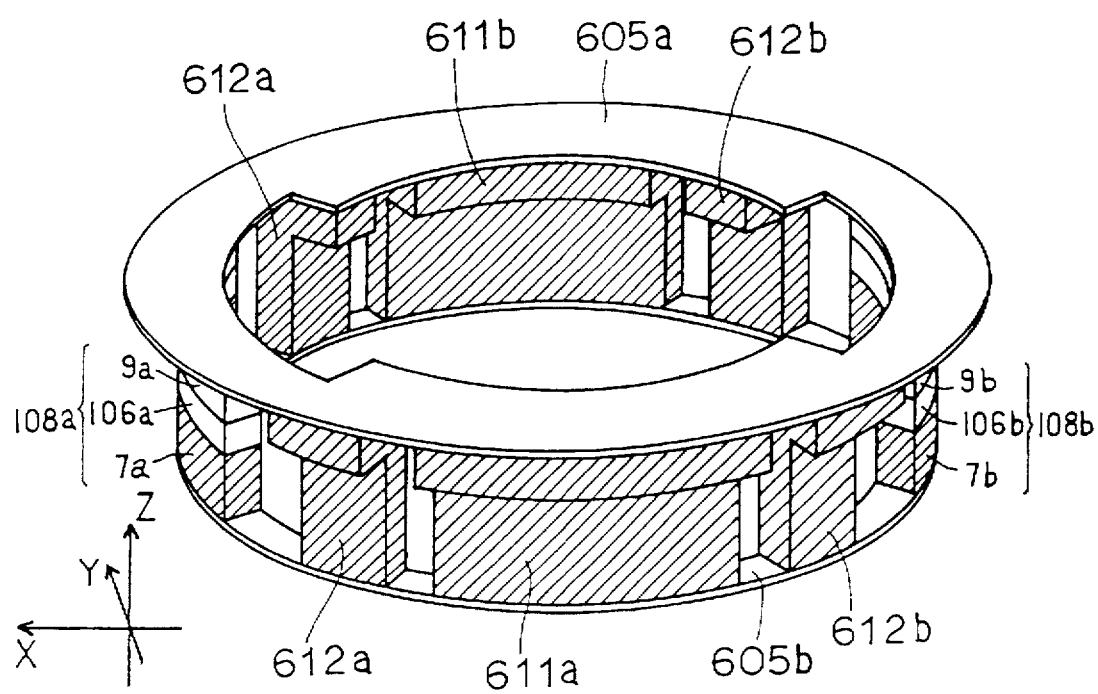
FIG. 21 is a perspective view schematically showing a structure of parallel plate springs and a member gripped therebetween, mounted on a rotary head type magnetic recording reproducing apparatus in accordance with a seventh embodiment of the present invention.

Referring to FIG. 21, in the present embodiment, the second plate spring 605b which is restricted in space by the yoke 13 has similar shape as that of embodiments 1 to 6. By contrast, the first plate spring 605a which is less restricted in space has wider radial width as compared with the first plate spring of the first to sixth embodiments above.

The fixed members 611a, 611b and head height adjusting members 612a, 612b gripped between parallel plate springs 605a, 605b have relatively large shape at portions where they are joined with the first plate spring 605a, while they have relatively small shape at portions where they are joined with the second plate spring 605b.

As described above, in the present embodiment, the width in the radial direction of the first plate spring 605a constituting the parallel plate springs is made wider than the width in the radial direction of the second plate spring 605b. This facilitates attachment of the head base on the first plate spring 605a and, in addition, vibration of movable members 108a and 108b especially around the X and Y axis can be effectively suppressed.

The shapes of the first and second plate springs 605a and 605b are not limited to those mentioned and any shape may be used, provided that they are within the basic concept of the present invention.

In the rotary head type magnetic recording reproducing apparatus in accordance with one aspect of the present invention, first and second coils are provided opposing to both side surfaces of a permanent magnet, and therefore driving force can act on both side surfaces of the permanent magnet. Therefore, even if stiffness of the parallel plate springs is increased, parallel plate springs can be sufficiently displaced, hence the first order and the higher order resonance frequencies can be increased, and thus responsiveness in dynamic tracking can be improved.

Further, since the stiffness of plate springs can be increased, vibration of the magnetic head during recording can be suppressed.

Further, since the yoke constituting a magnetic circuit is arranged on the fixed drum, mass of the movable portion of the parallel plate springs can be reduced. Therefore, the first order and higher order resonance frequencies can be increased, and hence responsiveness of dynamic tracking can further be improved.

In addition, since driving force can act on both side surfaces of the permanent magnet, action of a moment in the rotational direction on the movable portion of the parallel plate springs can be prevented. Therefore, peak value of the gain at the rotational resonance can be reduced, and responsiveness of dynamic tracking can further be improved.

In the rotary head type magnetic recording reproducing apparatus in accordance with a preferred aspect of the present invention, the permanent magnet is attached to the plate spring with a shield plate formed of a soft magnetic material interposed. Therefore, leakage flux from the permanent magnet is absorbed by the shield plate, and thus influence by the leakage flux on the magnetic head can be prevented.

In the rotary head type magnetic recording reproducing apparatus in accordance with another preferred aspect of the present invention, the yoke has an arcuate shape and it is provided not over the entire periphery. Therefore, as compared with an example in which the yoke is provided over the entire periphery, a space can be obtained in the fixed drum by the amount corresponding to the omission of the yoke. Therefore, when this space is utilized, various other functions and higher functions can be obtained while maintaining the size of the apparatus.

In the rotary head type magnetic recording reproducing apparatus in accordance with a further aspect of the present invention, absolute height of the magnetic head can be adjusted at the time of assembly of the drum apparatus, by pressing a prescribed position of the plate spring by means of a plate spring pressing member.

In the rotary head type magnetic recording reproducing apparatus in accordance with a preferred aspect of the present invention, the first plate spring constituting the parallel plate springs has wider radial width than the second plate spring. Therefore, at the time of assembly of the drum apparatus, attachment of the magnetic head on the first plate spring is facilitated. Further, since the first plate spring has wider radial width, stiffness of the first plate spring is improved, thus suppressing vibration of the magnetic head.

In the rotary head type magnetic recording reproducing apparatus in accordance with another preferred aspect of the present invention, two sets of permanent magnets are magnetized in opposite directions. Therefore, by supplying DC bias current to the driving coils, magnetic head group which is positioned at a relatively high position can be displaced downward, while the magnetic head group positioned at a relatively lower position can be displaced upward, and thus relative heights of the two sets of magnetic head groups can be adjusted.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A rotary head type magnetic recording reproducing apparatus, comprising:

a fixed drum having an axis;

a rotor including a rotary drum supported rotatable about said axis on said fixed drum; and first and second plate springs each having a movable portion and a fixed portion, with said fixed portion supported on said rotor such that said movable portion is displacable in a direction along said axis; wherein said first and second plate springs oppose to each other with a prescribed distance therebetween;

said rotary head type magnetic recording reproducing apparatus further comprising:

a magnetic head fixedly attached on said movable portion of said first plate spring;

a movable member gripped between said movable portion of said first plate spring and said movable portion of said second plate spring;

driving means for displacing said movable portions of said first and second plate springs in a direction along said axis;

a plate spring pressing member supported on said rotor so as to apply pressure to an intermediate portion of said first and second plate spring in a direction along said axis; and a head height adjusting member gripped between said intermediate portion of said first plate spring and said intermediate portion of said second plate spring.

2. The rotary head type magnetic recording reproducing apparatus according to claim 1, wherein a distance between said fixed portion and said intermediate portion of said plate spring pressed by said plate spring pressing member is shorter than that between said movable portion and said intermediate portion.

3. The rotary head type magnetic recording reproducing apparatus according to claim 1, wherein a width in a radial direction of a rotary plane rotating about said axis of a portion between said fixed portion and said intermediate portion of said plate spring pressed by said plate spring pressing member is wider than a width in the radial direction of a portion between said intermediate portion and said movable portion.

4. The rotary head type magnetic recording reproducing apparatus according to claim 1, wherein a width of said first plate spring in a radial direction of the rotary plane rotating about said axis is wider than a width in the radial direction of said second plate spring.

* * * * *